United States Patent [19]
Kaneko

[11] Patent Number: 6,167,562
[45] Date of Patent: *Dec. 26, 2000

[54] APPARATUS FOR CREATING AN ANIMATION PROGRAM AND METHOD FOR CREATING THE SAME

[75] Inventor: Hiroshi Kaneko, Mitaka, Japan

[73] Assignees: Kaneko Co., Ltd., Tokyo, Japan; Hitachi Software Engineering Co., Ltd., Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,425

[22] Filed: May 8, 1997

[30] Foreign Application Priority Data

May 8, 1996 [JP] Japan .................................. 8-137535

[51] Int. Cl.⁷ .................................................. G06F 9/445
[52] U.S. Cl. .................................... 717/1; 717/2; 717/11; 345/425
[58] Field of Search .................................... 345/425, 429, 345/473; 395/701, 702; 717/1, 2, 11

[56] References Cited

U.S. PATENT DOCUMENTS

| | | | |
|---|---|---|---|
| 4,517,654 | 5/1985 | Carmean | 345/435 |
| 4,588,187 | 5/1986 | Dell | 463/47 |
| 4,952,051 | 8/1990 | Lovell et al. | 345/473 |
| 5,325,473 | 6/1994 | Monroe et al. | 345/429 |
| 5,384,667 | 1/1995 | Beckwith | 386/55 |
| 5,680,534 | 10/1997 | Yamato et al. | 345/473 |
| 5,696,892 | 12/1997 | Redmann et al. | 345/425 |
| 5,742,521 | 4/1998 | Ellenby et al. | 702/127 |
| 5,781,184 | 7/1998 | Wasserman et al. | 345/202 |
| 5,999,698 | 12/1999 | Redmann et al. | 345/425 |

OTHER PUBLICATIONS

Breugnot, et al., "GAME: an object–oriented approach to computer animation in flexible manufacturing system modelling", ACM, pp. 217–227, Apr. 1991.

Kahn, "Seeing systolic computations in a video game world", IEEE Symposium, pp. 95–101, Sep. 1996.

Marsh et al., "The Rochester checkers player: multimodel parallel programming for animate vision", IEEE Computer, pp. 12–19, Apr. 1991.

*Primary Examiner*—Tariq R. Hafiz
*Assistant Examiner*—Ted T. Vo
*Attorney, Agent, or Firm*—Mattingly, Stanger & Malur, P.C.

[57] ABSTRACT

The apparatus for creating an animation program can create animation programs for use with game software and presentations with high efficiency, without requirements for a high degree of programming techniques. The animation program creating apparatus has a moving image drawing device with a program storing circuit for storing animation programs, a character image drawing circuit for drawing character images, and a background image drawing circuit for drawing background images, which is further provided with an image input unit for entering animating image information, an image editing unit for editing the animating image information entered by the image input unit, an animation management circuit for managing multiple pieces of the entered image information by creating an animation program in an image-drawing unit of drawing an image by sorting the multiple pieces of the entered image information in a time series and by providing the animation program with an animation number, and an operating unit for operating the moving image drawing device to reproduce the animation program created.

7 Claims, 28 Drawing Sheets

| | 41a | 41b | 41c | 41 |
|---|---|---|---|---|
| ANIMATION NO. | KIND OF DISPLAY | DISPLAY CONTINUATION TIME | ...... | |
| A 1 | 10 TO RIGHT | 3 SECONDS | ...... | |
| A 2 | ...... | ...... | ...... | |
| A 6 | ...... | ...... | ...... | |
| ...... | ...... | ...... | ...... | |

TIME ↓

| ANIMATION NO. (42a) | IMAGE NO. (42b) | DISPLAY TIME (PER ONE IMAGE) (42c) | COLOR (42d) | SOUND (42e) | YES/NO OF IMAGE INVERSION (42f) | ... |
|---|---|---|---|---|---|---|
| A 1 | G 1 | | | | | ... |
| | ⋮ | | | | | ... |
| | G 2 2 | | | | | ... |
| A 2 | G 9 | | | | | ... |
| | G 1 5 | | | | | |
| | G 2 1 | | | | | |
| | G 1 | | | | | |
| | G 1 9 | | | | | |
| A 3 | G 1 5 | | | | | |
| | ⋮ | | | | | |

TIME ↓

Fig. 6

| IMAGE NO. (43a) | IMAGE INFORMATION (43b) |
|---|---|
| G 1 | DATA 1 |
| G 2 | DATA 2 |
| G 3 | DATA 3 |
| G 4 | DATA 4 |
| ⋮ | ⋮ |
| G n | DATA n |

Fig. 7

| MAP NO. | SCROLL STATUS | SCROLL CONTINUATION TIME | ...... |
|---|---|---|---|
| MP 1 | COMPULSORY, 12 TO TOP | 45 SECONDS | ...... |
|  | ⋮ | ⋮ |  |
| MP 6 | ⋮ | ⋮ |  |
| ⋮ | ⋮ | ⋮ |  |

Fig. 9

| MAP NO. | BLOCK LOCATION MATRIX | BLOCK NO. | STATUS BLOCK NO. | ... |
|---|---|---|---|---|
| MP 1 | (0, 0) | BK10 | SBK2 | ... |
|  | (0, 1) | BK12 | SBK3 | ... |
|  | ⋮ | ⋮ | ⋮ | ... |
| MP 2 |  |  |  |  |
| ⋮ |  |  |  |  |
| MP n |  |  |  |  |

Fig. 10

| BLOCK NO. 46a | CELL LOCATION MATRIX 46b | CELL NO. 46c | ... 46 |
|---|---|---|---|
| BK1 | (0, 0) | CL1 | ... |
| | (0, 1) | CL5 | ... |
| | ⋮ | ⋮ | ... |
| BK2 | | | ... |
| ⋮ | | | |
| BKn | | | |

TIME ↓

Fig. 11

| CELL NO. 47a | CHIP LOCATION MATRIX 47b | CHIP NO. 47c | COLOR 47d | YES/NO OF IMAGE CONVERSION 47e | ... 47 |
|---|---|---|---|---|---|
| CL1 | (0, 0) | CP3 | RED | NO | ... |
| | (0, 1) | CP10 | BLUE | NO | ... |
| | (0, 1) | CP12 | GREEN | NO | ... |
| CL2 | | | | | |
| ⋮ | ⋮ | ⋮ | ⋮ | ⋮ | |
| CLn | | | | | |

TIME ↓

Fig. 12

| CHIP NO. ~48a | IMAGE INFORMATION ~48b | ~48 |
|---|---|---|
| C P 1 | DATA 1 | |
| C P 2 | DATA 2 | |
| C P 3 | DATA 3 | |
| C P 4 | DATA 4 | |
| ⋮ | ⋮ | |
| C P n | DATA n | |

| STATUS BLOCK NO. ~71a | STATUS CELL LOCATION MATRIX ~71b | STATUS CELL NO. 71c | ... 71 |
|---|---|---|---|
| SBK1 | (0, 0) | SCL1 | ... |
| SBK2 | (0, 1) | SCL1 | ... |
| ⋮ | ⋮ | ⋮ | ... |
| SBKn | | | ... |

Fig. 15

| STATUS CELL NO. ~72a | STATUS CHIP LOCATION MATRIX ~72b | STATUS CHIP NO. 72c | ... 72 |
|---|---|---|---|
| SCL1 | (0, 0) | SCP1 | ... |
| SCL2 | (0, 1) | SCP1 | ... |
| ⋮ | ⋮ | ⋮ | ... |
| SCLn | | | ... |

Fig. 16

| STATUS CHIP NO. ~73a | STATUS INFORMATION ~73b | CHARACTER OCCURRENCE INFORMATION 73c | ... 73 |
|---|---|---|---|
| SCP1 | | | ... |
| SCP2 | | | ... |
| ⋮ | ⋮ | ⋮ | ... |
| SCPn | | | ... |

Fig. 17

```
Sample_chr_Init()
{
    TaskEntry( ˉSample_chr_Main,0,0,0,0);
    SpcAllocBuffer( 1);
    SpcSetCharacter( 1, A1 );
    SpcSpcPosition( 1, 50, 100 );
{
Sample_chr_Main()
{
    SpcMoveXposition( 1, 5 );
    If(SpcGetXposition( 1 ) == 150 ) {
        SpcReleaseBuffer( 1 );
        TaskRelease();
    }
)
```

Fig. 29

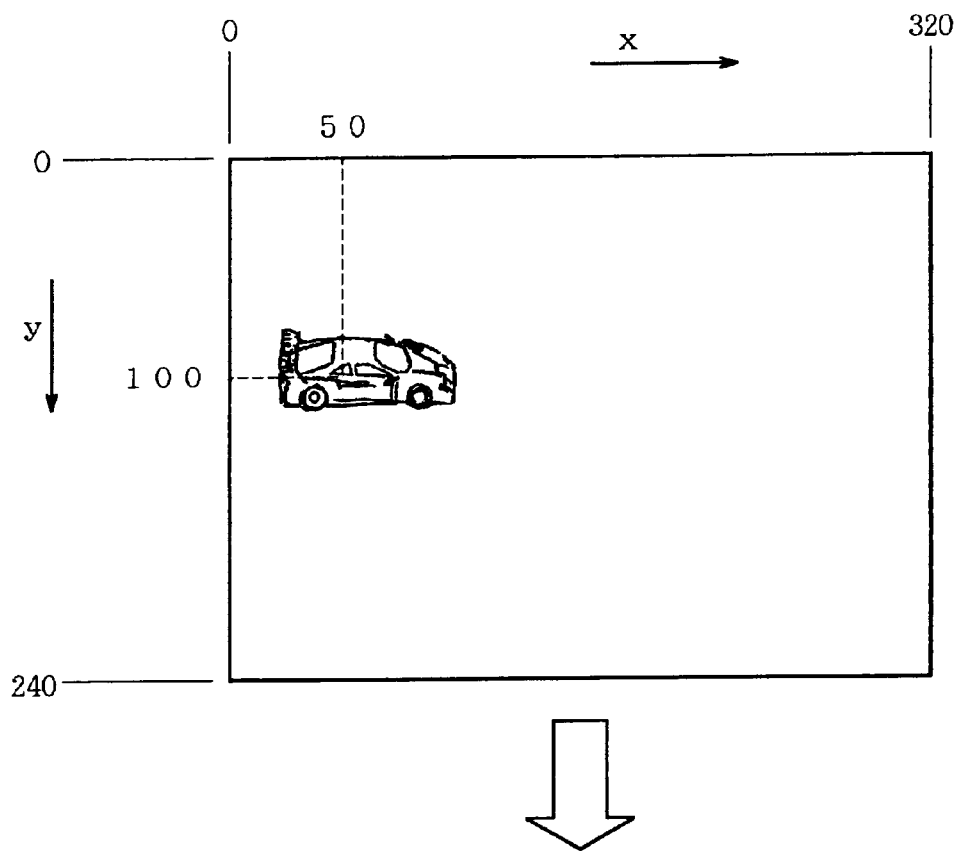
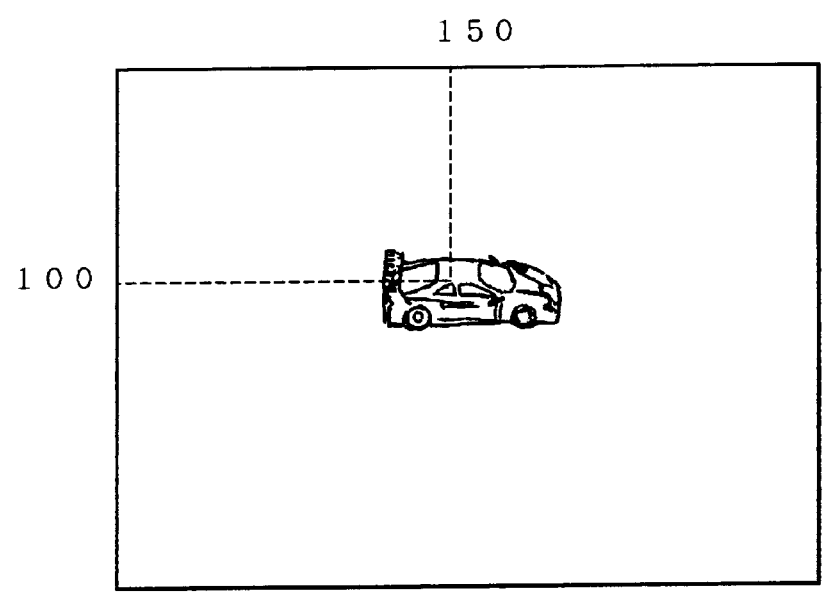
Fig. 30

```
Int MotionDat [9] [2]
{
    { SetDir,   40  } ,
    { SetSpd,  100  } ,
    { Move,     60  } , { SetDir,  -40  } ,
    { Move,     60  } , { SetDir,  180  }
    { SetSpd,  200  } ,
    { Move,     40  } , { Jump,      0  } ,
}

Sample_seq_Init()
{
    TaskEntry( ~Sample_seq_Main );
    SpcAllocBuffer( 5 );
    SpcSetCharacter( 5, A3 );
    SpcSpcPosition( 5, 70, 128 );
    SetSequnce( ~MotionDat );
}
Sample_Seq_Main()
{
    If(SeqDrv() == 0 ) {
        SpcReleaseBuffer( 5 );
        TaskRelease();
    }
}
```

Fig. 31

```
Int ScenarioDat [6] [2] = {

{ Call,  ¯MapInit        } ,
    { Wait,   100            } ,
    { Call,  ¯Sample_chr_Init } ,
    { End,   0               }
   }

Sample_mapper_Init()
 {
    TaskEntry( ¯Sample_mapper_Main );
    SetSequnce( ¯ScenarioDat );
 }

Sample_mapper_Main()
 {
    If(SeqDrv() == 0 ) {
       TaskRelease();
    }
 }
```

Fig. 33

APPARATUS FOR CREATING AN ANIMATION PROGRAM AND METHOD FOR CREATING THE SAME

BACKGROUND OF THE INVENTION

1. Field of the Invention

The present invention relates to an apparatus for creating an animation program and a method for creating the same and, more particularly, to an animation program creating apparatus for creating an animation program for use with the step of manufacturing an animation program to be frequently employed with game machines and with a variety of presentations or other actions, and a method for creating the same.

2. Description of the Related Art

So far, development has been made of animation programs for a variety of games running on arcade game machines, home game machines, personal computers and so on. Such animation programs are employed with programs for games, referred to generally as "game software", and the actions of the animation programs in the game software are the significant element that can be enjoyed by people ranging from young people to grownup people.

The animation programs in such game software are constructed in such a manner that, for example, characters such as people and animals, background images and so on are displayed on a display screen and that their actions are controlled by an instruction from an operation input device such as a control button or a joystick device. Therefore, users can interactively proceed with the games by entering the control information from an operation button, a mouse as a pointing device or an operation input device such as a joystick device or a keyboard, while viewing the images displayed by the game software, such as the characters, background images and so on, on the display screen.

Such game software is developed generally by cooperative work of many people, such as game creators who are planning the scenario of a game, designers creating characters, background images and so on to be employed in the game, people creating music and sounds such as sound effects, and people programming the game programs (game software) according to the scenario of the game. Each person takes over its own portion of the work and all the portions of the work carried out by all of the people involved are eventually combined into one game software.

So far, however, a computer program for such a game has been created according to a method in which programmers having a high level of professional knowledge of computer programming techniques are creating the programs by including all the information such as pictures, their actions, effects sounds and so on, integrally into source programs, while making reference to the scenario of the game, the characters, the background images and so on drawn by designers and so on for use with the scenario of the game.

The source programs created in the manner as described hereinabove are then completed into a program for the game and can be executed as a game program by translating (compiling) them into a type executable on computers such as, for example, home game machines or personal computers or on an operating system or the like. At this stage, the program of the game can be confirmed for the first time as to whether it can run as intended by the programmers.

The computer game programs are created in the manner as described hereinabove proceeding with the programming by including the scenario of the game, the images (pictures) of the characters, the background images and so on to be employed in the scenario of the game, their actions, the effects sounds and so on integrally into the source programs. Therefore, the programmers cannot try to move, for example, the images (pictures) such as the characters and the background images to check whether they can move as the actual game software until the program has been completed.

Therefore, even if the planning is intended to be changed or modified during the creation of the game software or when the manner of execution of the game software is intended to be viewed at a certain stage of creating the game software, the execution of the game software cannot be implemented until the programs have been completed by the programmers. Further, once the program has been completed, the source program itself has to be changed or modified even if either of the scenario or the pictures such as the characters or the background images is intended to be changed or modified. Whenever such demands arise, the program has to be changed or modified, the type of execution has to be compiled into an executable type, and whether such changes or modifications can run as required has to be confirmed. As a matter of course, such work leads to a very poor efficiency in creating game software.

In addition, as only the actions of the images cannot be simulated separately from the execution of the scenario of the game, the game is planned and reviewed as to whether the images can run as intended by using plural sheets of paper on which pictures (picture scripts) are drawn. However, as the simulation on the paper may often be different from the actual actions by running the completed program, a series of the operations from the changes of the source program to the test execution of the program has to be performed whenever changes or modifications of the game are desired. This presents the problems that efficiency of development of the games becomes very low.

Furthermore, in order to create a game program, as the hardware, the operating systems, the programming languages and so on, on which the game program can run, vary with their manufactures, the programmers have to create the programs with the different programming language prepared in different ways by each of the manufactures in accordance with the different hardware specifications and so on. Therefore, the programmers have to be well acquainted with such different hardware specifications and programming language specifications for the game program and such things require the programmers to bear big burdens.

SUMMARY OF THE INVENTION

Therefore, it is an object of the present invention to provide an apparatus for creating an animation program that does not require an operator to be acquainted with a high degree of programming techniques and that provides an efficient way of creating an animation program to be available for game software, presentations or other purposes.

In order to achieve the object, a first aspect of the present invention provides an apparatus for creating an animation program having a moving image drawing device comprising a program storing circuit for storing an animation program; a character image drawing circuit for drawing a character image, drivable by said animation program; and a background image drawing circuit for drawing a background image, drivable by said animation program; comprising: image input means for entering image information to be animated; image editing means for editing said animating image information entered by said image input means; animation management means for managing said entered image information by creating an animation program in an image-drawing unit of drawing an image by sorting said multiple pieces of said entered image information in a time series and by providing the animation program with an animation number; and operating means for operating said moving image drawing device to reproduce the animation program created by said animation management means.

In a second aspect, the present invention provides the animation program creating apparatus further characterized in that the operating means gives an instruction to reproduce a image-drawing unit of the animation program provided with the animation number.

In a third aspect, the present invention provides the animation program creating apparatus further characterized in that the image input means is a manual image input device of a tablet type.

A fourth aspect of the present invention provides an animation program creating apparatus having a moving image drawing device comprising a program storing circuit for storing an animation program; a character image drawing circuit for drawing a character image, drivable by said animation program; a background image drawing circuit for drawing a background image, drivable by said animation program; and a sound creating circuit, comprising: image input means for entering image information to be animated; sound information input means for entering sound information; image editing means for editing said animating image information entered by said image input means and said sound information entered by said sound information input means; animation management means for managing an animation program by creating the animation program in an image-drawing unit of drawing an image by sorting said multiple pieces of said entered image information and sound information in a time series and by providing the animation program with an animation number; and operating means for operating said moving image drawing device to reproduce the animation program created by said animation management means.

In a fifth aspect, the present invention provides the animation program creating apparatus further characterized in that the animation management means is provided with the function providing for the motion of the animation in the image-drawing unit and that the reproduction of the image-drawing unit provided with the animation number is made using the function. This feature allows the images to be reproduced by the created animation information in order to confirm the motion of the animation even without the aid of a moving image drawing device for exclusive use.

A sixth aspect of the present invention provides a method for creating an animation program for use with a moving image drawing device having the program storing circuit for storing the animation program, the character image drawing circuit for drawing the character image, and the background image drawing circuit for drawing the background image, each drivable by the animation program, further characterized in that information on an animating image is entered, the image information is edited, the animation program as the image-drawing unit is created by sorting the multiple pieces of the edited image information in a time series and providing the image-drawing unit of the animation program with the animation number, and reproducing the created animation program in the moving image drawing device by specifying the animation number.

When the animation program is created by the animation program creating apparatus according to the present invention, the contents of the animation program in the image-drawing unit edited so far can immediately be confirmed even during the creating of the animation program because a portion of the created animation program can be reproduced in the image-drawing unit by the moving image drawing device having the moving image drawing performance equal to a game machine. This allows the program to be modified and changed easily in the process of the creation of the program.

The present invention can confirm the animation screen close to the almost completed contents of the game at a stage of planning the development of the game only by creating a portion of the animation program and can adjust the animation program without carrying out programming work, thereby shortening the development period as a whole. Further, as the animating picture can be created by the feeling of a pencil or a painting brush because the tablet is employed as the image input means, thereby performing the efficient working with the image to be employed in the animation program.

Other objects, features and advantages of the present invention will become apparent in the course of the description of this specification, with reference to the accompanying drawings.

BRIEF DESCRIPTION OF THE DRAWINGS

FIG. 6 is a view for describing the data contents of animation information.

FIG. 7 is a view for describing the data contents of image information A.

FIG. 9 is a view for describing the data contents of scroll information.

FIG. 10 is a view for describing the data contents of map information.

FIG. 11 is a view for describing the data contents of block information.

FIG. 12 is a view for describing the data contents of cell information.

FIG. 15 is a view for describing the data contents of status block information.

FIG. 16 is a view for describing the data contents of status cell information.

FIG. 17 is a view for describing the data contents of status chip information.

FIG. 29 is a view showing an example of a source program for animating a character.

FIG. 30 is a view showing an animation by a source program of FIG. 29.

FIG. 31 is a view showing an example of a source program for animating a character by animation information and motion information.

FIG. 33 is a view showing an example of a source program with the progress of the images drawing process programmed in accordance with scenario data.

DESCRIPTION OF THE PREFERRED EMBODIMENTS

Figure 1:
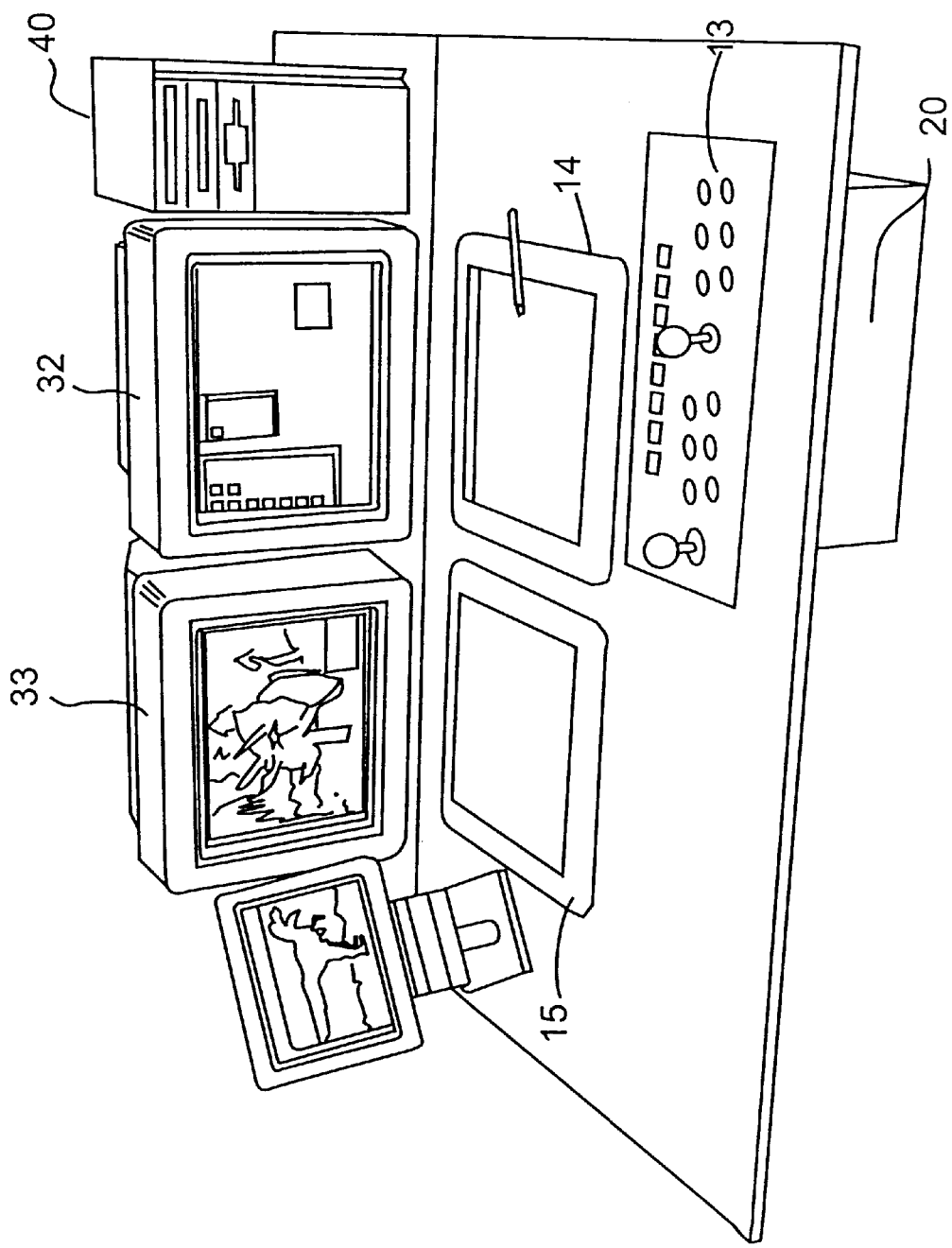
FIG. 1 is a perspective view showing an outlook of the animation program creating apparatus according to an embodiment of the present invention.
Figure 2:
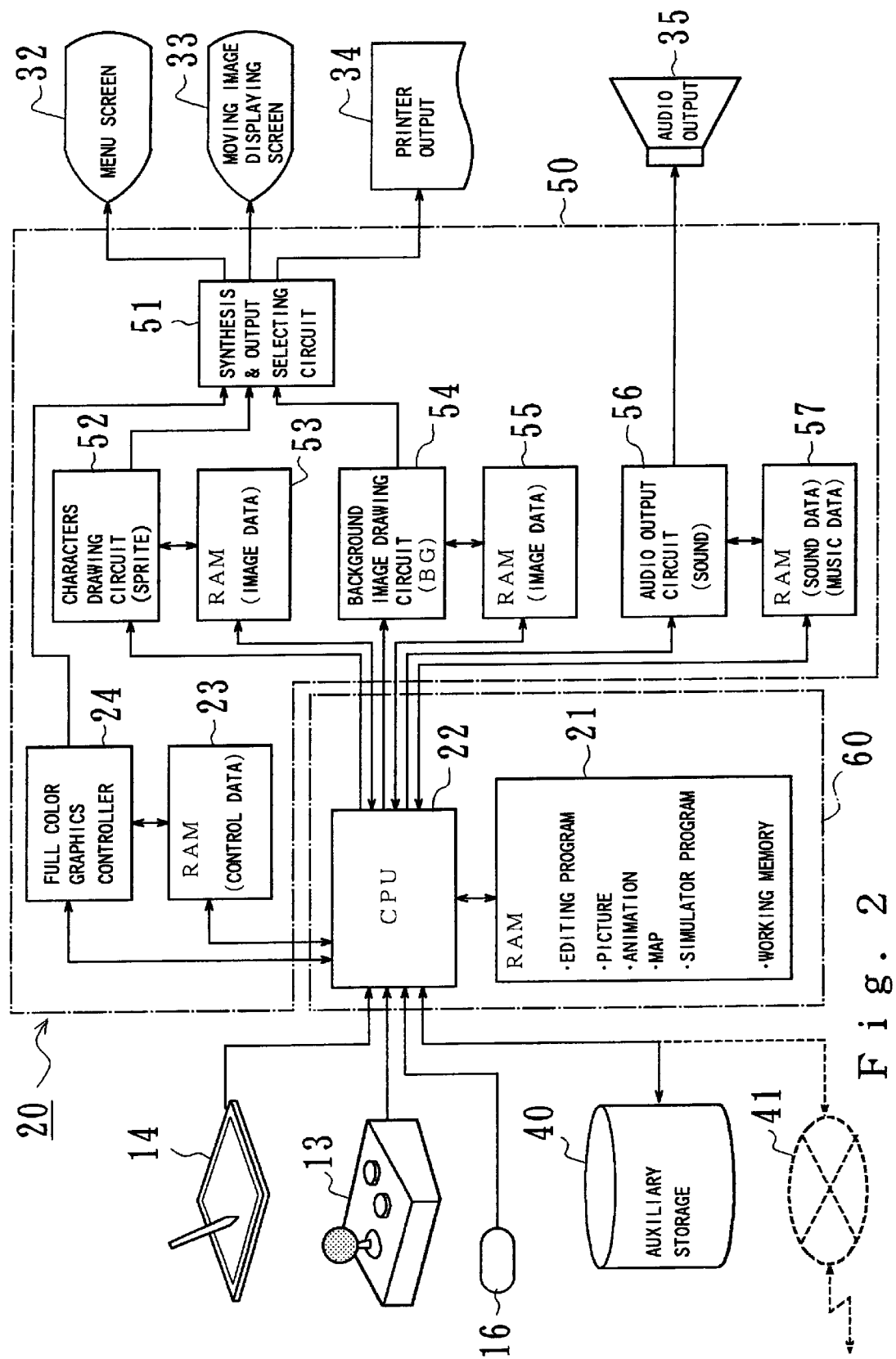
FIG. 2 is a block diagram for describing the construction of a hardware circuit of the animation program creating apparatus according to an embodiment of the present invention.

FIG. 1 is a perspective view showing an outlook of an animation program creating apparatus according to an embodiment of the present invention. FIG. 2 is a block diagram for describing the construction of a hardware circuit for the animation program creating apparatus according to the embodiment of the present invention. The animation program creating apparatus according to the embodiment of the present invention will be described with reference to FIGS. 1 and 2.

As shown in FIG. 1, the animation program creating apparatus according to the embodiment of the present invention comprises a joystick device 13 for operating an animation program, a tablet input device 14, a scanner device 15 of a type that can be operated manually for retrieving only a necessary portion of an image by manual operation, a main body portion 20 of a system unit for the animation program creating apparatus, a first display 32 for displaying an edit operating screen, a second display screen 33 for displaying an animation, and an auxiliary storage 40. In the animation program creating apparatus, the joystick device 13 and the tablet input device 14 are disposed on an operating table, with the scanner device 15 disposed thereon. At the rear side of the operating table are disposed the auxiliary storage 40, the first display screen 32 and the second display screen 33. On the bottom side of the operating table is disposed the main body portion 20 of the system unit including a moving image drawing device with a hardware circuit. For the auxiliary storage 40, there may be employed a personal computer (a server device) with a built-in hard disk unit having a large capacity, in order to ensure convenience for handling data for the animation program created.

A description will now be made of the construction of the hardware circuit of the main body portion 20 of the system unit. As shown in FIG. 2, the hardware circuit of the main body portion 20 of the system unit comprises the joystick device 13, the tablet device 14, an audio input/output device 16 for entering audio data, such as a microphone, the main body portion 20 of the system unit, a main memory 21 for storing editing programs and data, a central processing unit 22, a control memory data for controlling a screen, a graphics controller 24, the first display screen 32 for displaying the edit operating screen, the second display screen 33 for displaying the animation, a printer device 34, a sound output device 35 such as a speaker, the auxiliary storage 40, a data communications network 41, a main body portion 50 of the moving image drawing device, a synthesis/output selecting circuit 51 for selecting the synthesis for synthesizing a character image with a background image and the output of the synthesized image, a character drawing circuit 52, a first memory 53 for an animation program for storing data for drawing a character image, a background image drawing circuit 54, a second memory 55 for an animation program for storing data for drawing a background image, a sound output circuit 56, a third memory 57 for an animation program for storing an audio data, and a system control section 60.

As shown in FIG. 2, the main body portion 20 of the system unit of the animation program creating apparatus comprises two hardware circuits consisting of the main body portion 50 of the moving image drawing device and the system control section 60. The main body portion 50 of the moving image drawing device is provided with the first memory 53 for an animation program for storing data for drawing the character image, the second memory 55 for an animation program for storing data for drawing the background image, and the third memory 57 for an animation program for storing the audio data, as a program storing circuit for storing the animation program, and with the character image drawing circuit 52, the background image drawing circuit 54 and the sound output circuit 56, as a hardware circuit for exclusive use in drawing a moving image. For controlling the screen, there are further provided a control memory 23 for storing data for controlling a screen and a graphics controller 24. The hardware circuit for exclusive use in drawing the moving images can achieve performance for drawing images that can be drawn on the screen at a speed as high as drawing 60 frames or more per second at a real time at the time of simulation.

For a basic video game, it is usual that 60 frames of the screens are rewritten at every second, however, when a personal computer is employed as an environment for creating images, it cannot provide the speed for drawing 30 frames or more at full screen in most cases even if using a software for implementing a process for drawing images such as an animation, and it lacks a simulating capability. If the exclusive hardware circuit for drawing moving images having the structure as described hereinabove is to be employed, the simulating capability at a real time can be realized because the construction of the hardware circuit is equivalent of that of game machines. The exclusive hardware circuit as employed herein has the circuit construction for allocating the character image drawing process and the background image drawing process to each of custom chips in an optimal fashion, so that it can realize performance for drawing images at a real time. When images are drawn using a graphics accelerator, the images can be drawn at the timing of an instruction given by the software. For such exclusive hardware circuit, however, can permit drawing images at an optimal timing when a necessary value is set to the register.

The character image drawing circuit 52, the background image drawing circuit 54 and the sound output circuit 56 are operated by the data for drawing the character images, the data for drawing the background images, and the audio data stored in the first memory 53, the second memory 55, and the third memory 57, respectively, to allow the synthesis/output selecting circuit 51 to create the animation program, thereby displaying the animation images on the second display screen 33 and generating the reproduced sounds from the speaker 35.

In the main body portion 50 of the moving image drawing device having the construction as described hereinabove, the character image drawing circuit 52, the background image drawing circuit 54 and the sound output circuit 56 are the circuits for controlling the images drawing of the hardware circuit having substantially the same hardware construction as those of game machines. Further, the first memory 53, the second memory 55 and the third memory 57 as the memories for storing the control data (data for drawing the images) for those circuits are constructed by readable and rewritable random-access memory (RAM) so as to be programmable.

In game machines executing the game programs including actual animation programs completed, the moving image drawing circuit for processing the game program is constructed by a hardware circuit similar to the hardware circuit of the character image drawing circuit 52, the background image drawing circuit 54 and the sounds output circuit 56. As a program memory for controlling the moving image drawing circuit, i.e. as a memory for storing the game program (the data for drawing the image) the moving image drawing circuit is provided with a game program memory as a read-only memory (ROM), which has a construction similar to the first animation program memory 53, the second animation program memory 55, and the third animation program memory 57. The difference between the moving image drawing circuit of a game machine and the main body portion 50 of the moving image drawing device in the animation program creating apparatus according to the present invention resides in the fact that the memory is a read-only memory (ROM) or a random-access memory (RAM).

The basic construction of the animation program creating apparatus according to the present invention comprises program storing circuits 53, 55, 57 for storing the animation programs, the image input device, for example, such as the tablet input device 14, for entering the information on the animating images in the main body portion 50 of the moving image drawing device with the character image drawing circuit 52 and the background image drawing circuit 54, each of which can be driven by the animation program, the system control section 60 for editing the entered image information, creating the animation program as the image-drawing unit of the animation program by sorting the multiple pieces of the edited image information in a time series, and managing the image-drawing unit by providing it with the animation number, and the joystick device 13 for reproducing (playing) the animation program of the image-drawing unit using the main body portion of the moving image drawing device by the operation similar to the operation by an actual game machine.

When a portion of the created animation program is reproduced by the operation of the joystick device 13, a portion of the image-drawing unit is reproduced by specifying the image-drawing unit provided with the animation number. Further, in this case, as the tablet input device 14 is employed as an image input device, when a picture is to be drawn by the animation images acting as an element of the animation program, such a picture can be drawn by the feeling of manually drawing a picture, thereby enabling the designers to easily draw a unique picture by their own sensitive feeling.

In order to correspond the audio data to the animation program and add the sounds to the images, the animation program creating apparatus according to the present invention is further provided with the audio output circuit 56 and the third animation program memory 57 for storing audio data. For this purpose, the device is provided with the microphone or an audio input/output terminal as the audio input device 16 for entering audio data. The system control section 60 edits information on the image data and the audio data entered, creates the animation program as an image-drawing unit by sorting the multiple pieces of the edited image data and audio data in a time series, and manages the animation program with the audio data added thereto by providing the created animation program with the animation number. This arrangement likewise allows the joystick device 13 to reproduce a unit for drawing a moving image of the created animation program by implementing the operation in substantially the same manner as an actual game machine by using the main body portion 50 of the moving image drawing device in the manner as described hereinabove.

The animation program creating apparatus having the construction as described hereinabove allows the main body portion 50 of the moving image drawing device to reproduce a portion of the created animation program at any stage in the process of creating the animation program by specifying the animation number, thereby immediately confirming the contents of the animation program in the unit of drawing the moving image created until then. Hence, the program can be modified or changed readily even if it is still in the process of creating. In this case, the contents of the created animation program can be confirmed in a surer way because the created animation program can be reproduced as the unit of drawing the moving image by the moving image drawing device having the same moving image-drawing performance as an actual game machine.

Therefore, the animation screen close to the almost completed contents of the game can be confirmed even in the stage of planning the development of the game simply by creating a portion of the animation program so that the animation program can be adjusted without performing the programming work, thereby shortening the period of development of the game to a great extent as a whole. Furthermore, as the tablet input device 14 is employed as the image input means, the animating picture can be created as it is drawn with a pencil or a painting brush, the work for creating the images to be employed in the animation program can be carried out with high efficiency.

Figure 3:
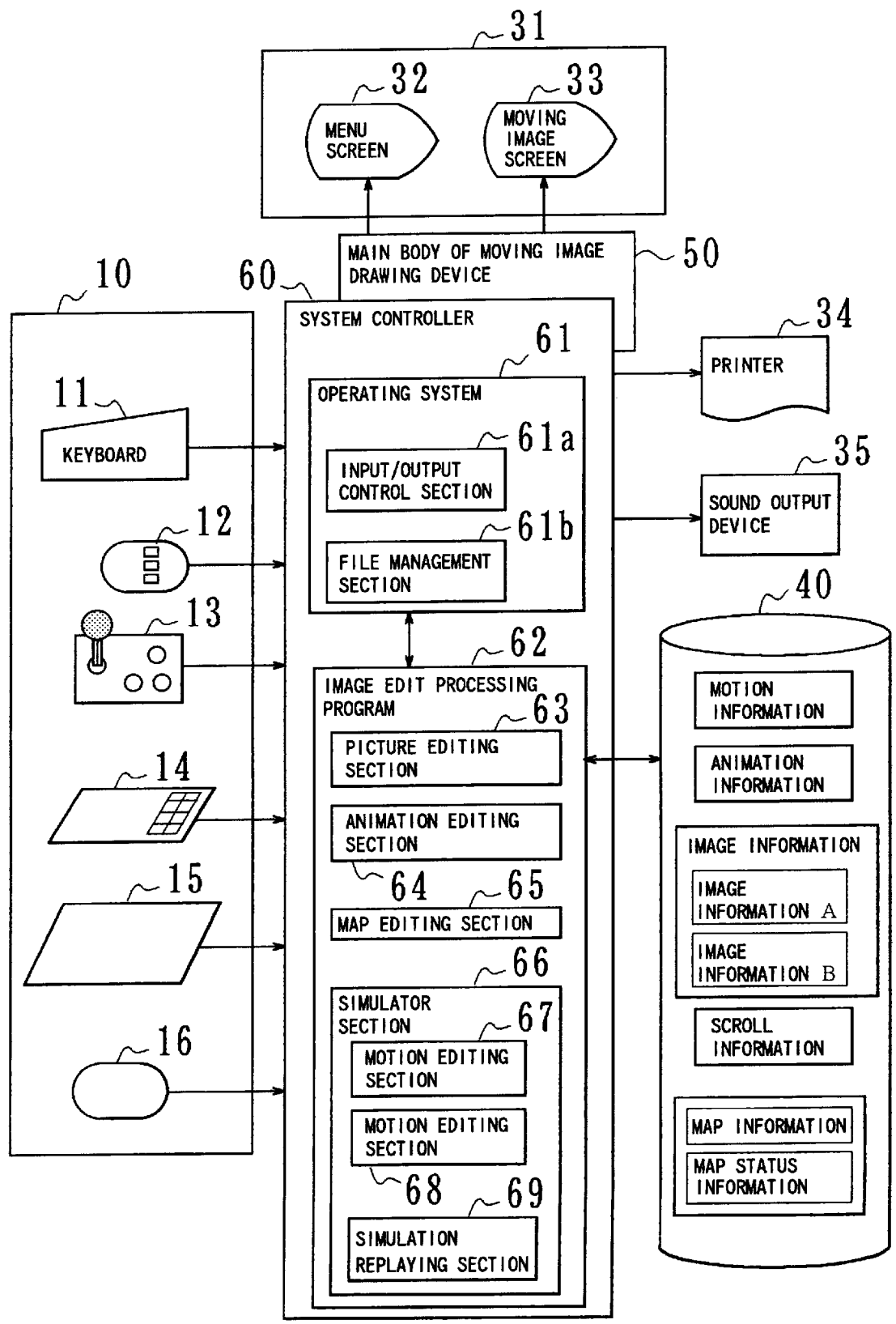
FIG. 3 is a block diagram for describing the system construction of the animation program creating apparatus according to an embodiment of the present invention.

Then, a description will be made of the system control section 60 acting as an essential section for creating the animation program. FIG. 3 is a block diagram showing the system construction of the animation program creating apparatus according to the present invention and shows the system construction with the system control section 60 centered round and its peripheral devices attached thereto.

As shown in FIG. 3, the system construction comprises an input device section 10, a keyboard 11, a mouse device 12, the joystick device 13, the tablet input device 14, the scanner device 15 for entering images, the audio input device 16 for entering audio data, a display device section 31, the first display screen 32 for displaying a screen for an editing operation, the second display screen 33 for displaying an animation, the printer device 34, the speaker 35 for generating sounds, an auxiliary storage 40, the main body portion 50 of the moving image drawing device, and the system control section 60. The system control section 60 comprises an operating system 61, a program 62 for processing an editing operation, a picture editing section 63, an animation editing section 64, a map editing section 65, a simulator section 66, a motion editing section 67, a scroll editing section 68, and a simulation reproducing section 69. With the system construction as described hereinabove, a digital camera may be employed for entering background images, in place of the scanner device 15.

As shown in FIG. 3, the input device section 10 is provided with the keyboard 11 for entering characters, such as letters, numbers, etc., the mouse device 12 as a pointing device, the joystick device 13 for test operations of the animation program created, the tablet input device 14 for entering images manually created, the scanner device 15 for entering images separately created, the audio input device 16 for entering the audio data such as effects sounds and so on. The input device section 10 can receive a variety of data including the image data and the audio data acting as basic data for creating the animation program.

The main body portion 20 of the system control section comprises the operating system section 61 for controlling a variety of the input and output devices and controlling a variety of the processing programs and the image edit processing program section 62 for implementing the processes for creating the animation program based on the image data, the audio data and the edit control data entered by the input device section 10.

The operating system section 61 is provided with an input/output control subsection 61*a* for controlling the hardware circuit of the various input/output devices and controlling the input and output of data, as is well known in general computer technology, and a file management subsection 61*b* for managing files and data by sending and receiving data, programs and so on between and from multiple computers and between and from various files and by controlling the programs.

The image edit processing program section 62 comprises the picture editing section 63, the animation editing section 64, the map editing section 65, and the simulator section 66. The simulator section 66 is further provided with the motion editing section 67, the scroll editing section 68, and the simulation reproducing section 69.

The picture editing section 63 in the image edit processing program section 62 processes and edits the images entered from the image input device such as the tablet input device 14, the scanner device 15 or the like. The animation editing section 64 edits the image data processed and edited by the picture editing section 63, for example, image data of the characters, e.g. mainly persons or animals, along the time axis via the image drawing device 50 in order to display the image data on the display device section 31. The edited image data of the characters and so on are stored as image information A in the auxiliary storage 40 and the data for animation are stored in the auxiliary storage 40 as an animation data after the animation number is added to each of the moving image drawing units.

The map editing section 65 edits data relating to the location of the images of the characters with respect to the background images in the animation image screen. In other words, the map editing section 65 edits information to locate (display) still images, mainly multiple background images etc., generated from the picture editing section 63, in substantially the same manner as the editing by the animation editing section 64. The image data of the background images edited by the map editing section 65 are stored in the auxiliary storage 40 as map information and map status information. On the other hand, the image data of the background images edited by the picture editing section 63 are stored in the auxiliary storage 40 as image data B.

The simulator section 66 implements the process for displaying (reproducing) a portion of the element of the animation program in the process of creating as a unit of drawing an image on the display device section 31. The motion editing section 67 edits a manner of displaying the character images on the time axis on the display screen by using data relating mainly to the characters generated by the picture editing section 63 and the animation editing section 64. The scroll editing section 68 edits a manner of displaying the background images on the time axis on the display screen by using data of the still images relating mainly to the background picture generated from the picture editing section 63 and the map editing section 65. Further, the simulation reproducing section 69 displays (reproduce) the moving animation images on the display device section 31 in combination of the characters images with the background images on the basis of the information edited by the motion editing section 67 and the scroll editing section 68.

The display device section 31 is provided with the first display 32 and the second display 33. The first display 32 displays the image data of editing objects, entered from the input device section 10, and displays a variety of menu information to be employed for each of the edit processes by the image edit processing program section 62. The second display 33 displays the image data in a unit of drawing the image of the animation program edited by the image edit processing program section 62 in an image-drawing quality as high as an actual game machine via the main body portion 50 of the image drawing device.

As the auxiliary storage 40, there may also be employed a storage, for example, such as a flexible disk (FD) device, a magneto-optic disk (MO) device or a hard disk (HD) device. In the auxiliary storage 40, the image information (the image information A for the character images and the image information B for the background images) edited by the picture editing section 63, the animation image information edited by the animation editing section 64, the map information and the map status information edited by the map editing section 65, the motion information edited by the motion editing section 67, and the scroll information edited by the scroll editing section 68 are stored as parts data of the game program including the animation program to be finally created.

The image information comprises the image information A of a files aggregate of the image data relating to a variety of the characters including mainly e.g. persons or animals and the image information B of a files aggregate of the image data relating to the background picture to be employed mainly in the game software, as will be described hereinafter. The map information comprises a main body portion of the map information and the map status information with the map information extended by addition of an attribute thereto. The printer device 35 prints out the edited image data in order to confirm the contents of the animation program and a full color printer device is employed preferably. Further, the sounds output device 35 generates the sounds such as music, effects sounds and so on in association with the drawn images of the animation program.

Now, a specific description will be made of procedures from the input of image data to the completion of a game software using the animation program creating apparatus having the system construction as described hereinabove. The procedures till the completion of the game software comprise entering the image data, editing the image data, combining the character images with the background images of the image data in a time series (on the two-dimensional space axis and the time axis), creating the animation programs in a unit of drawing a moving image to be managed by the animation number, and combining the animation programs in accordance with the scenario of the game.

Figures 4, 5:
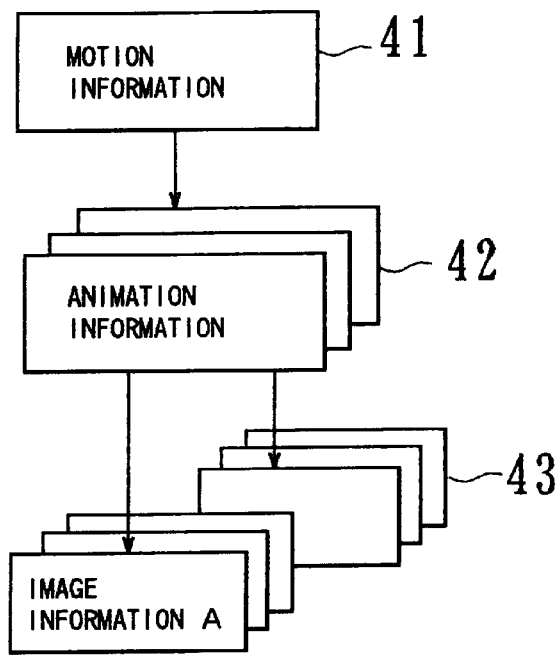
FIG. 4 is a view for describing the data construction for managing image data of a character.
FIG. 5 is a view for describing the data contents of motion information.

First, the data construction of the various data will be described. FIG. 4 describes the data construction for managing the image data of the characters, and FIG. 5 describes the contents of the data of the motion information. FIG. 6 describes the contents of the data of the animation image information and FIG. 7 describes the contents of the data of the image information A.

The image information A is stored under the control of the image number identifying the image data acting as an element of the characters. A storage region 43 for storing the image information A is provided with an image number field 43a and an image information field 43b. The image data stored in the image information field 43b, for example, "data 1, data 2, . . . data n", are managed in correspondence with the respective image numbers "G1, G2, . . . Gn" of the image number field 43a.

The animation image information comprises a combination of the image data of the multiple characters. As shown in FIG. 6, a storage region 42 for storing the animation image information comprises an animation number field 42a, an image number field 42b, a display time field 42c, a color field 42d, a sound field 42e, and an image inversion instruction field 42f. In each of the fields is stored data, thereby creating the animation image information.

In other words, the animation is implemented by combining the multiple character images so that the record with the attributes of the multiple pieces of the image data set as data of each field is managed by one animation number. A unit of the multiple image data to be managed by such one animation number is referred to as an image-drawing unit. More specifically, for example, as shown in FIG. 6, the animation image information having the animation number "A2" is comprised of five pieces of the character image data having image numbers "G9, G15, G21, G1, and "G19".

Further, the animation image information having the data contents as described hereinabove further forms a motion information by integration with other multiple pieces of animation information. The motion information is defined herein as a combination of multiple pieces of animation information. Accordingly, as shown in FIG. 5, a storage region 41 for the motion information comprises an animation number field 41a, a display kind field 41b, and a display continuation time field 41c, each of which in turn is stored with data forming the motion information. Therefore, the data are managed by the motion information as a larger image-drawing unit.

The character images acting as parts data for creating such animation programs are formed into the animation image information by integration of the relationship of the data of multiple pieces of the image information A, and the animation image information is further formed into the motion information by integration of multiple pieces of the animation image information. Although the data are managed by such a hierarchical structure, the image data for the background images are managed by the data construction of a similar hierarchical structure.

Figure 8:
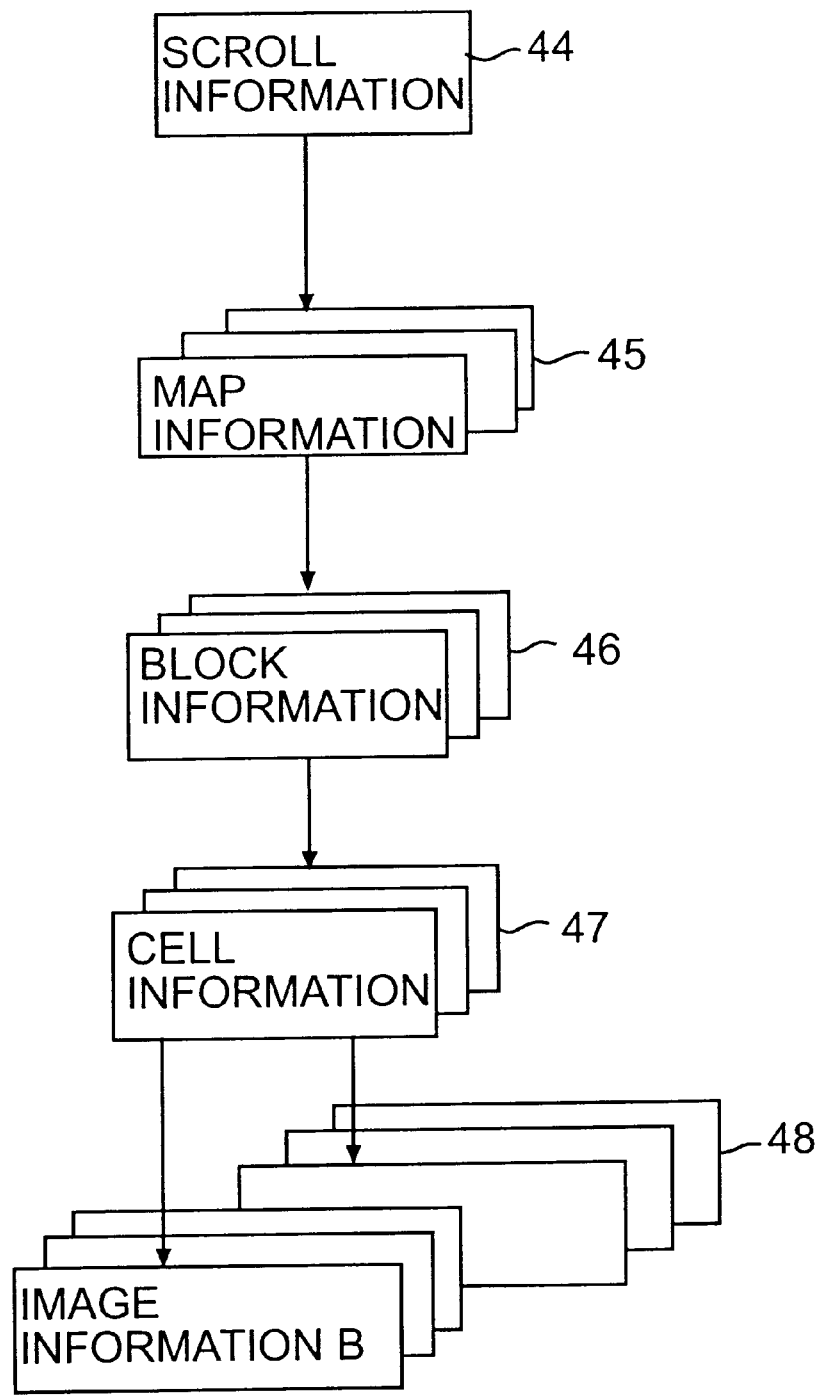
FIG. 8 is a view for describing the data construction for managing data of images for drawing background images of the drawing screen of the moving image.

FIG. 8 illustrates the data construction for managing the image data for drawing the background images on the screen for drawing moving images; FIG. 9 the data contents of the scroll information; FIG. 10 the data contents of the map information; FIG. 11 the data contents of the block information; FIG. 12 the data contents of the cell information; and FIG. 13 the data contents of the image information B. Now, the data management of the background images will be described with reference to these figures.

The image data acting as an element for drawing the background images is stored as the image information B and managed by a chip number for managing the image information. In a storage region 48 of the image information B, there are provided a chip number field 48a and an image information field 48b. The image data of the element of the background image stored in the image information field 48b, i.e. "data 1, data 2, . . . ", is managed by corresponding it to the respective chip numbers "CP1, CP2, . . . " in the chip number field 48a.

In the same manner as in the case of the animation image information as described hereinabove, the background images to be drawn as background in the case of drawing moving images is constructed by combining multiple pieces of the image data as elements of portions of the background image. In this case, the multiple pieces of the image data as the elements of the background image to be managed by the chip numbers are integrated into cell information. Accordingly, as shown in FIG. 12, in a storage region 47 for storing the cell information as an element constructing one window, i.e. one scene, there are provided a cell number field 47a, a chip location matrix field 47b, a chip number field 47c, a color field 47d, and an image inversion instruction field 47e, each of which is stored with data resulting in the formation of cell information.

As the cell information is information constructing a background picture in combination of the image data of multiple chip numbers, a record with the attributes of the multiple pieces of the image data set as data of each field is managed by one cell number. A unit of the multiple pieces of the image data to be managed by this cell numbers is a unit of drawing a background image. Specifically, as shown in FIG. 12, for example, the cell information having the cell number "CL1" comprises three pieces of the image data of the background picture having three chip numbers "CP3, CP10, CP12".

The cell information having the data contents as described hereinabove is formed into block information with multiple pieces of the cell information further integrated. Accordingly, the block information can be defined herein as information constructed by a combination of multiple pieces of the cell information. Hence, as shown in FIG. 11, a storage region 46 for storing the block information comprises a block number field 46a, a cell location matrix field 46b and a cell number field 46c, each of which is stored with data resulting in the formation of block information.

The block information is further integrated into map information constructing one background screen (one scene). As shown in FIG. 10, a storage region 45 comprises a map number field 45a, a block location matrix field 45b, and a block number field 45c, a status block number field 45d, each of which is stored with data resulting in the formation of map information. Multiple pieces of the map information constructing a background picture are combined in a time series and the attribute of the scroll continuation time for drawing the background picture on the time axis. This constructs image data acting as a part for drawing the background picture.

The image data of the background picture acting as parts data for creating the animation program are managed as a data construction as shown in FIG. 8, together with the image data of the character image as described hereinabove. More specifically, multiple pieces of image information B are integrated into cell information and multiple pieces of the cell information are in turn integrated into block information multiple pieces of which are further integrated into map information. Multiple pieces of the map information are then integrated in a time series to scroll information, thereby constructing a background image for the animation.

Figures 13, 14:
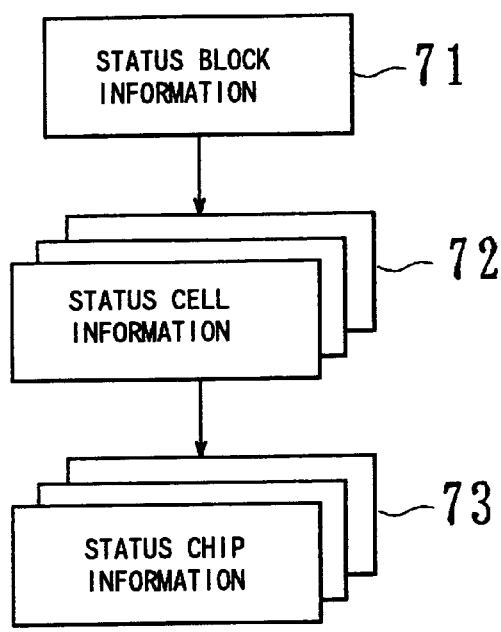
FIG. 13 is a view for describing the data contents of image information B.
FIG. 14 is a view for describing the data construction of map status information.

In order to correspond the position of displaying the image data of the character image in the background image constructed in the manner as described hereinabove, status information is formed as map status information in correspondence with the image data for drawing the background image. FIG. 14 shows the data structure of the map status information and the data structure thereof will now be described with reference to FIG. 14. As shown in FIG. 14, the map status information has status block information 71, status cell information 72 and status chip information 73 associated with each other.

FIG. 15 describes an example of the data contents of the status block information; FIG. 16 describes an example of the data contents of the scroll information; and FIG. 17 describes an example of the data contents of the status chip information. The data contents of the map status information will be described with reference to these figures.

As shown in FIG. 15, a region for storing the status block information 71 is provided with a status block field 71a, a status location matrix field 71b, a status cell number field 71c, and so on. Further, as shown in FIG. 16, a region for storing the scroll information 72 is provided with a status cell number field 72a, a status chip location matrix field 72b, a status chip number field 72c, and so on. Then, as shown in FIG. 17, a region for storing the status chip information 73 is provided with a status chip number field 73a, a status information field 73b, a character occurrence information field 73c, and so on. Each of those fields is stored with data.

Figure 18:
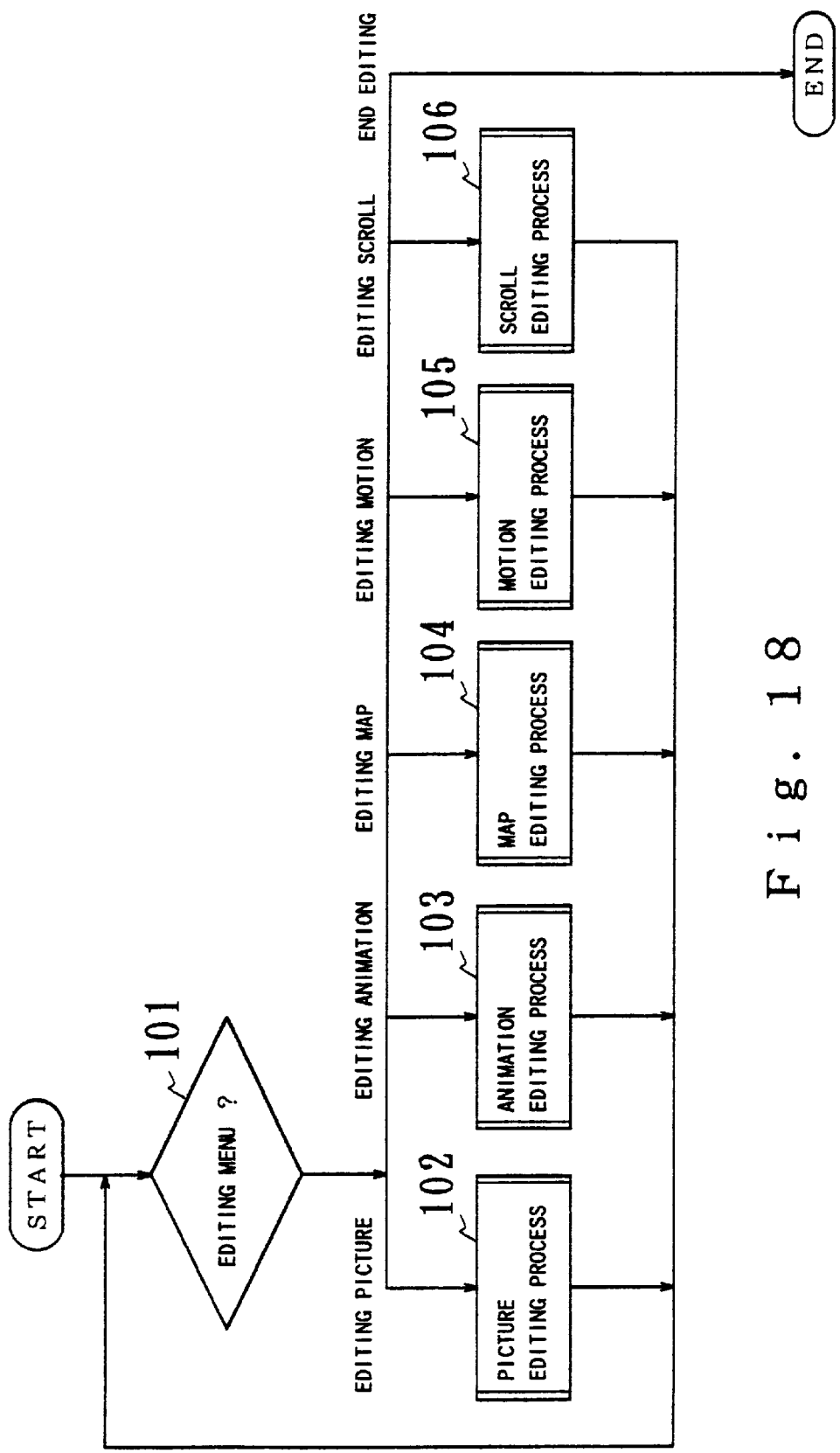
FIG. 18 is a flow chart showing a main processing flow of an image editing process.

Now, a description will be made of the process for creating an animation program by creating data having the data construction as described hereinabove. FIG. 18 shows a flow chart showing a main processing flow of an image editing process to be executed by the control of an image edit processing program section 62. Although the process relating to a user interface is omitted from the following description, the process which is described hereinafter is of a type in which the operator can proceed with the process interactively with the system.

As shown in FIG. 18, the main processing flow of the image editing process comprises a picture editing process, an animation editing process, a map editing process, a motion editing process and a scroll editing process. Each of those processes can be shifted to implement each editing process, thereby enabling the formation of image data necessary for creating an animation program.

Figure 19A:
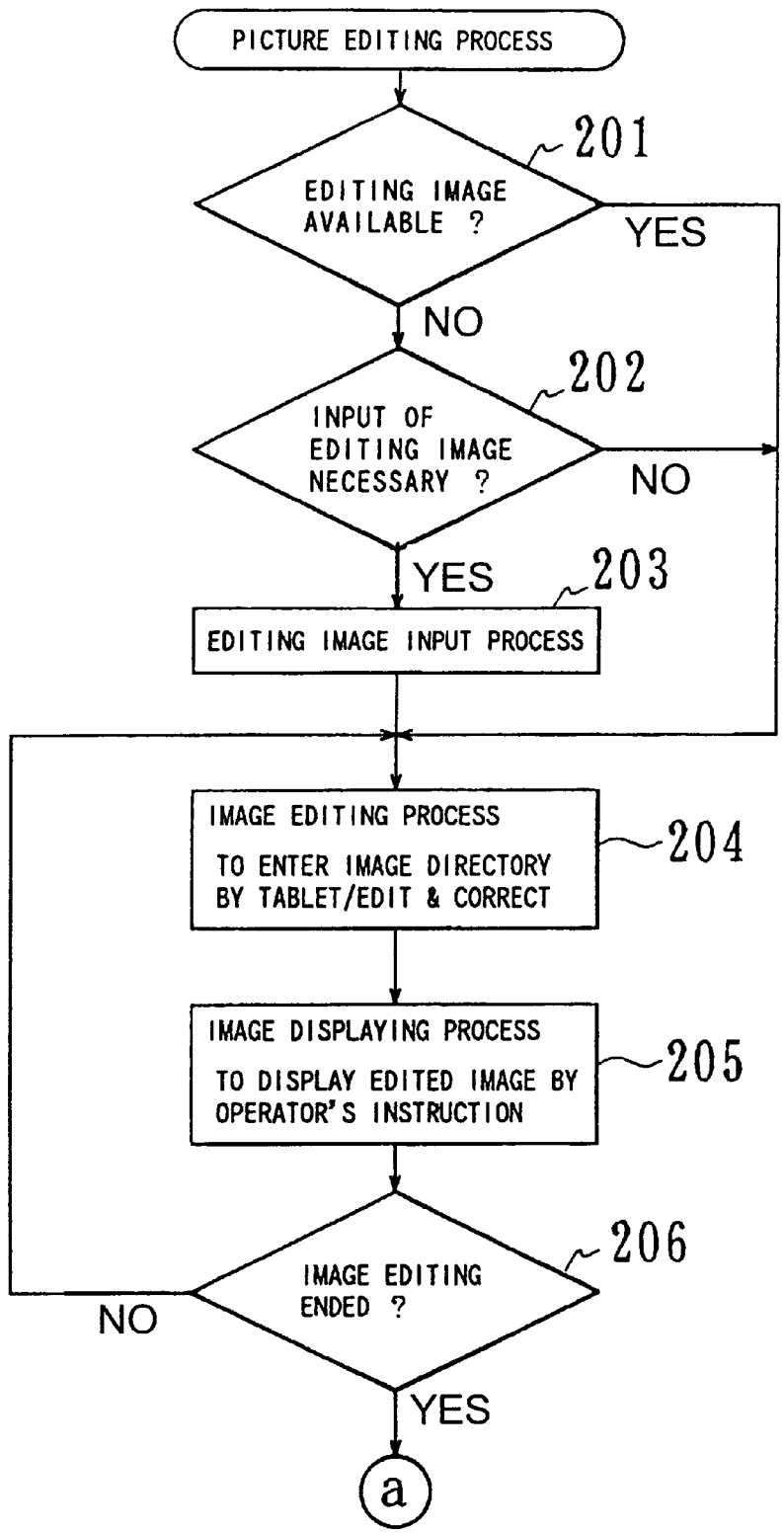
FIGS. 19A and 19B are a flow chart showing a processing flow of a picture editing process.
Figure 19B:
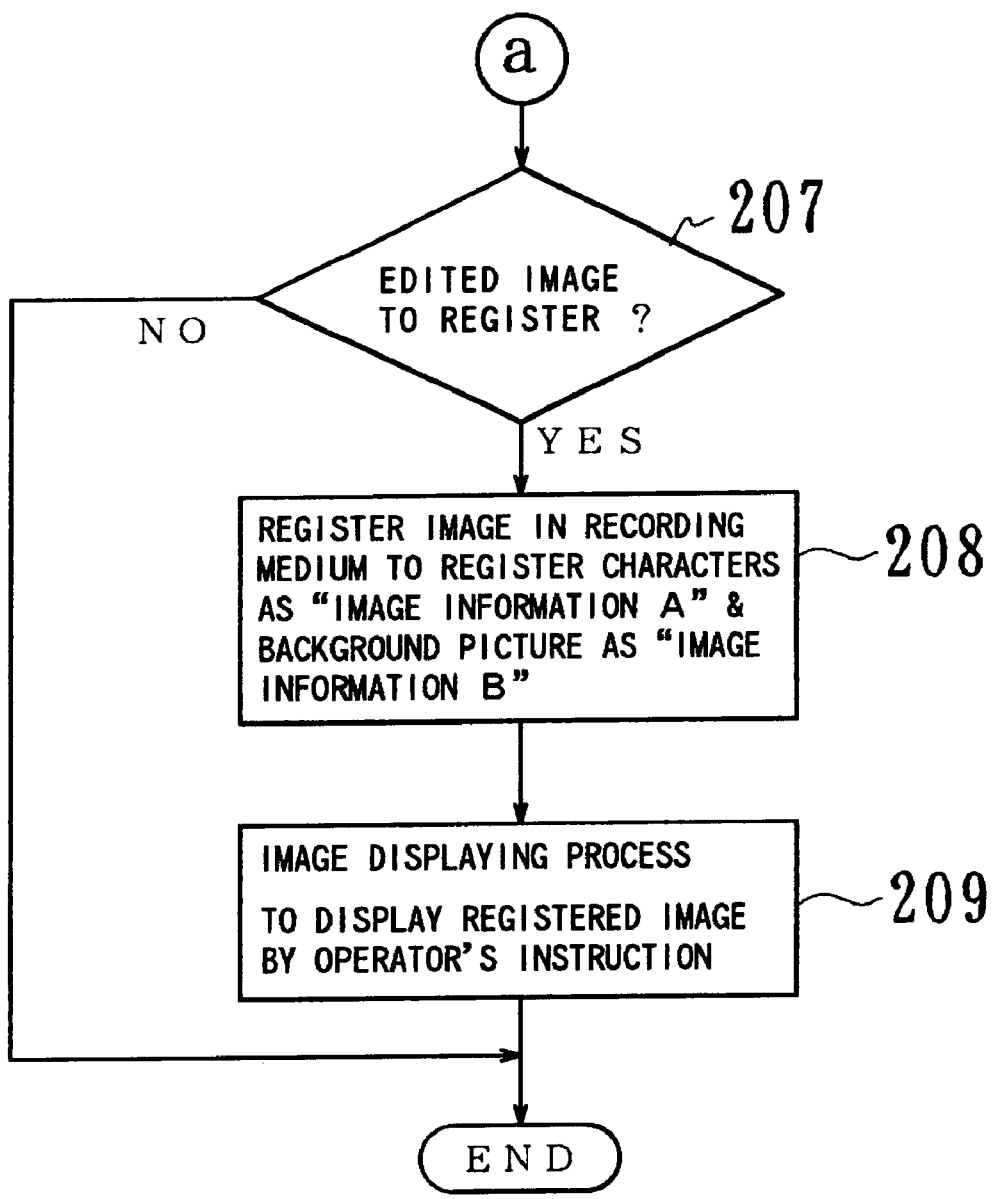

As the image editing process is started, it is decided at step 101 to determine what is an edit menu specified by the operator's instructions. For example, if the edit menu specified by the operator's instruction is to implement a picture editing process, the flow proceeds to step 102 at which the picture editing process is implemented for creating image data acting as basic material data for creating the animation program (as shown in FIG. 19). When the picture editing process is finished, the flow returns to the process for deciding the edit menu at step 101.

Figure 20:
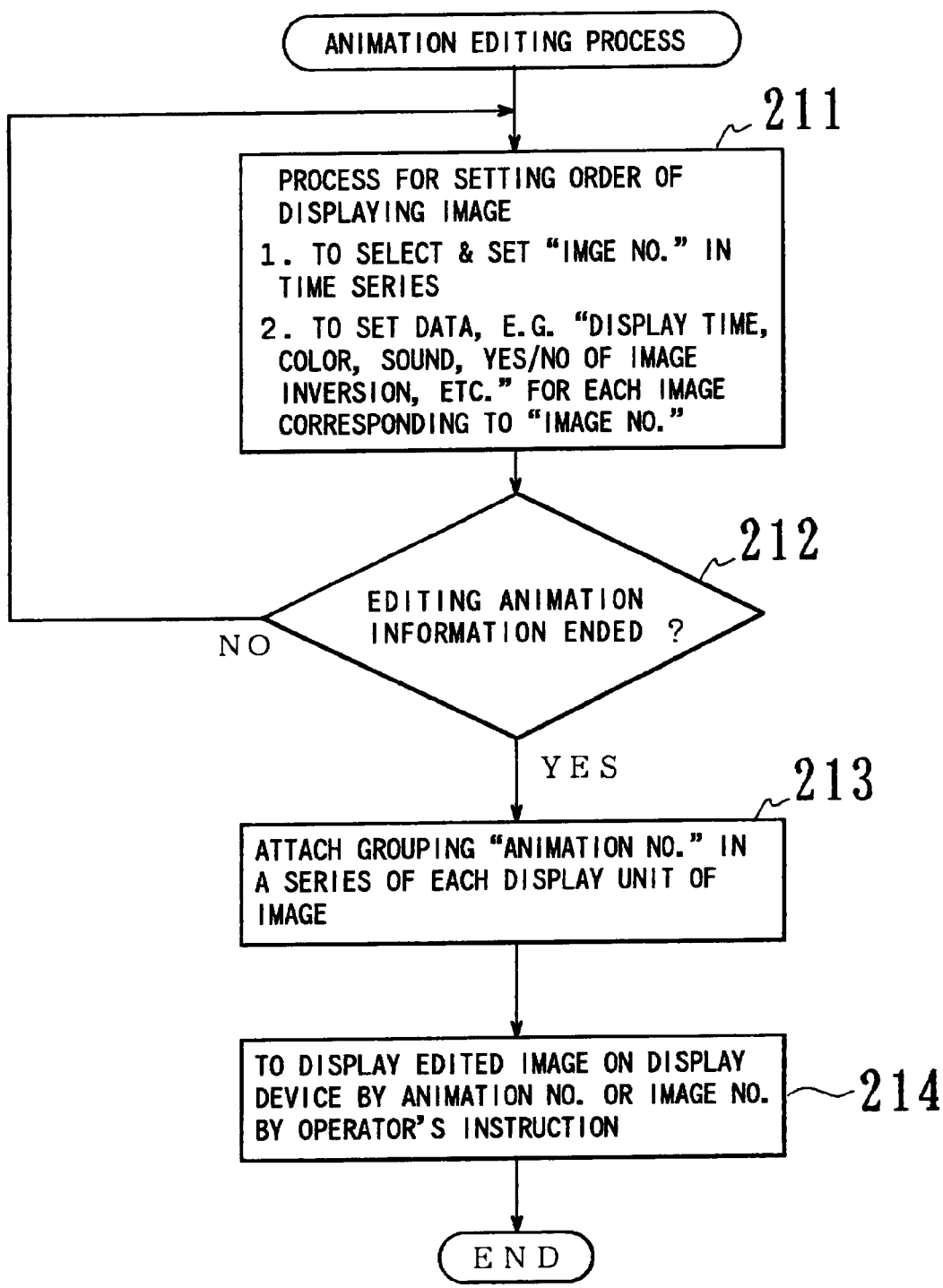
FIG. 20 is a flow chart showing a processing flow of an animation editing process.

At step 101, the operator is again asked to execute which editing process and it is decided to determine the editing process specified by the operator's instruction. If the edit menu specified by the operator's instruction is to implement an animation editing process, then the flow proceeds to step 103 at which the animation editing process is implemented for creating animation data in combination of image data of a character image (as shown in FIG. 20), followed by returning to the process for deciding the edit menu at step 101 as the animation editing process is finished.

Figure 21:
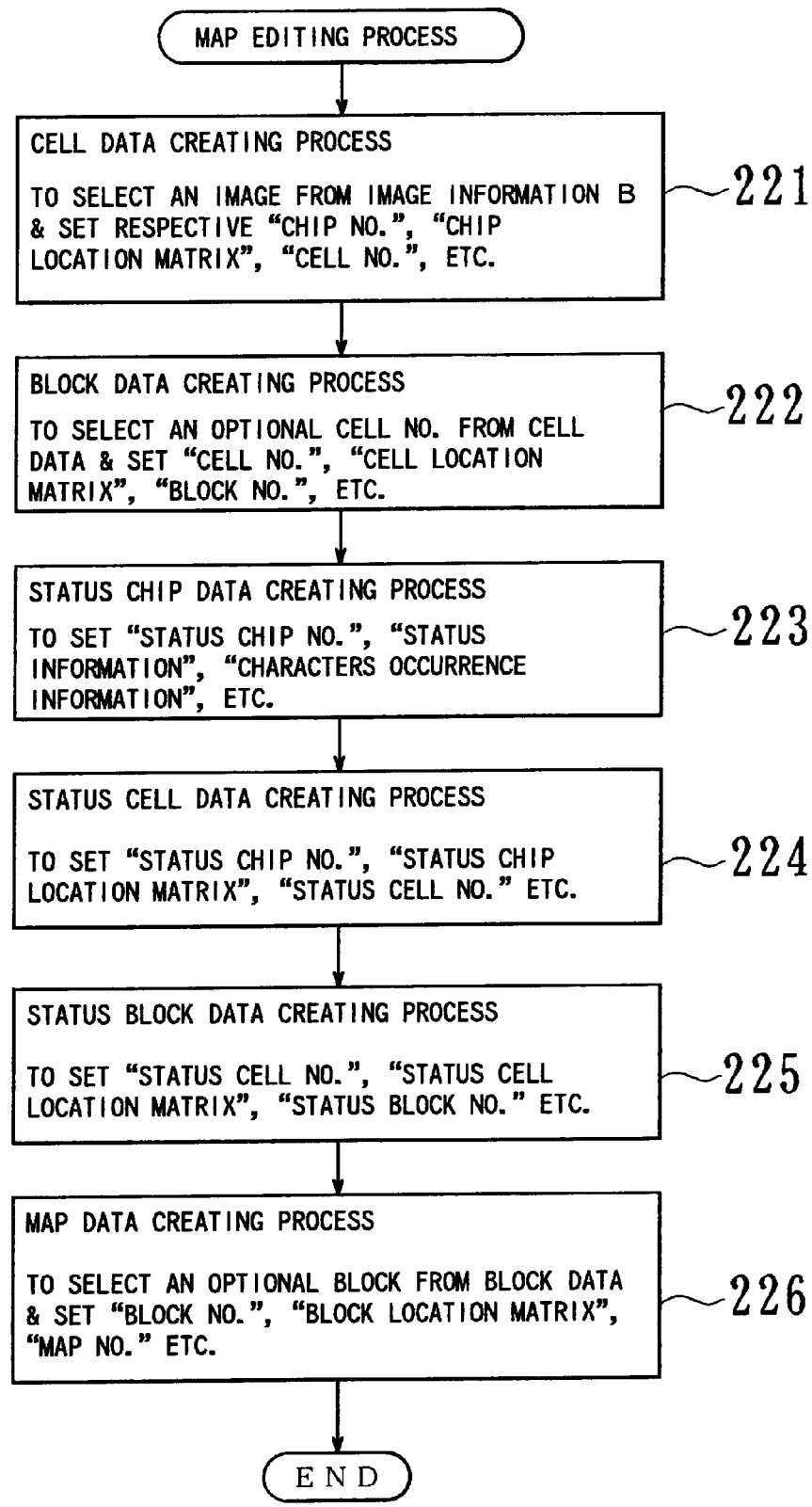
FIG. 21 is a flow chart showing a processing flow for implementing a process for editing map information.

Likewise, when the operator's instruction at step 101 is to implement a map editing process, the flow goes to step 104 at which the map editing process is implemented for creating map information in combination of image data of the background image (as shown in FIG. 21), followed by the return to the edit menu screen at step 101 after the map editing process has been finished.

Figure 22:
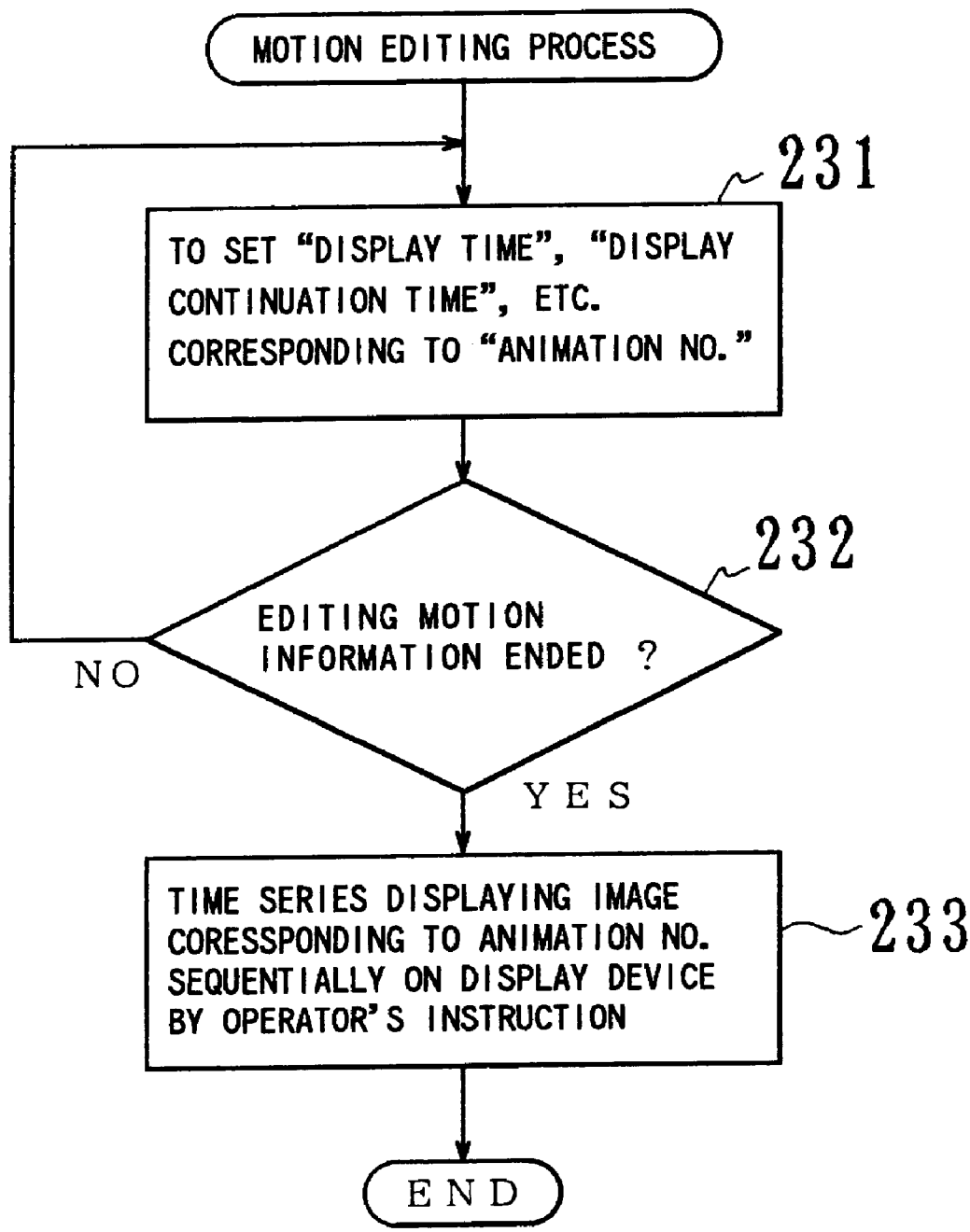
FIG. 22 is a flow chart showing a process for implementing a process for editing motion information.
Figure 23:
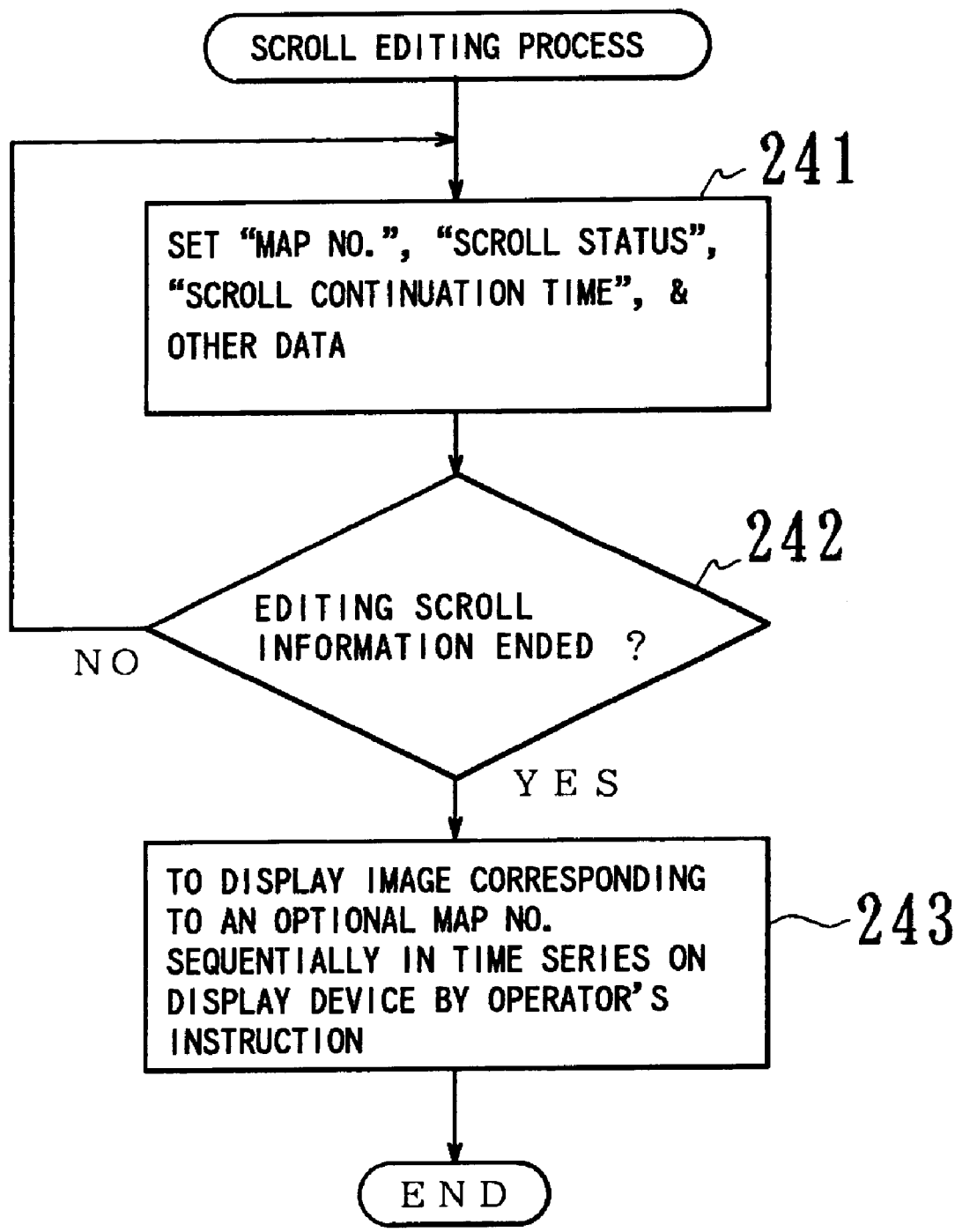
FIG. 23 is a flow chart showing a process for implementing a process for editing scroll information.

Further, when the operator's instruction specified at step 101 is to implement a motion editing process, the flow goes to step 105 at which the motion editing process is implemented using the animation image information created in the animation editing process previously implemented (as shown in FIG. 22). As the motion editing process has been finished, the flow is returned to the edit menu screen at step 101 for allowing the operator to select the next edit option. When the operator's instruction at step 101 selects a scroll editing process option, then the flow proceeds to step 106 (as shown in FIG. 23), followed by the return to the edit menu at step 101 after completion of the scroll editing process.

As the edit options menu contains an edit end option, the editing process ends when the user selects the option to end the editing process at step 101.

Then, a description will be made of the details of each of the editing processes i.e. for creating animation information using the image data created, map information, motion information, scroll information and so on.

FIG. 19 is a flow chart showing a processing flow for implementing the picture editing process and the picture editing process will be described with reference to FIG. 19. In the picture editing process, as the process is started, it is checked at step 201 to determine whether an image as an editing object is available. If no such an editing image is available at step 201, the input process is implemented to acquire an editing image data. After the input process has been completed, then the flow goes to step 202 at which it is decided to determine whether the input of the editing image is necessary. When the decision is made to input the image, then the flow goes to step 203 at which the image is entered. In the input process for entering it, the editing image may be entered directly from an image input device such as the scanner device 15 or the like. When the image data of the editing image are stored in a recording medium such as a floppy disk, the image data can be retrieved from the recording medium to display it on the display device 31 for confirmation. As the input process has been completed, the flow proceeds to step 204.

On the other hand, when it is decided at step 201 that the editing image as an editing object is available or when it is decided at step 202 that the input of the editing image is unnecessary, then the flow goes to step 204 and the editing image is subjected to the editing process, followed by proceeding to step 205. At step 205, the image constructed by the image data as a result of editing is displayed and at step 206, the decision is made to determine whether the editing of the image is completed. As the result of the decision at step 206 is to continue the editing process for editing the image, then the flow returns to step 204. On the other hand, as the result of the decision at step 206 is NO and the editing process is to terminate, then the step goes to step 207 to subject the edited image to a register process.

At step 207, it is decided to determine whether the data of the edited image are to be registered. In order to register the edited image data, the flow goes to step 208 at which the edited image data are subjected to the register process. In the register process for registering the images, the edited image data are registered in the auxiliary storage 40 as image information A or image information B. As described hereinabove, when it relates to the characters, then the edited image data are registered as the image information A and, when it relates to the background picture, then the edited image data are registered as the image information B. Then, at step 209, the images are subjected to the display process in order to confirm whether the registered image data are edited in a right way, followed by the termination of the picture editing process.

FIG. 20 is a flow chart showing the processing flow for processing the animation editing process for implementing the process for editing the animation information, and the animation editing process will be described with reference to FIG. 20. In the animation editing process, first at step 211, the setting process is implemented for setting the order of displaying images. In the setting process for setting the order of the displays of the images, there is set the data such as a display time for each of the image information having the respective image numbers, a color designation, a sound designation, YES/NO of image inversion, and so on. The setting of these data is performed on the menu display screen, and multiple pieces of the image information are integrated into and edited to the animation information and the links among the multiple pieces of the image information are performed by the image numbers.

Then, the flow proceeds to step 212 at which the decision is made to determine whether the editing of the animation information goes to end. If all of the editing processes are not yet finished, the process at step 211 is repeated until all the editing processes has been finished. On the other hand, when the instructions to end the animation editing process is given, the flow goes to step 213 at which an animation number for grouping is provided each for a series of units of displaying images, thereby enabling the management of the image-drawing units by the animation numbers. In order to confirm the edited animation information, then the flow goes to step 214 and the edited images corresponding to the animation numbers or the image numbers specified by the operator's instruction are displayed on the display device, followed by the end of the animation editing process.

The character images can be drawn on the basis of the animation information in the manner as described hereinabove. In order to draw a background picture on the display screen on which the character images are to be drawn, the image data created by the picture editing process are integrated, and the map information for drawing the background images are subjected to the edit process.

Then, a description will be made of the map information editing process with reference to FIG. 21 showing a flow chart for a processing flow of processing the map editing process. In the map editing process, as the process has been started, as shown in FIG. 21, the process for creating cell data is implemented at step 221. The cell data creating process comprises a selection of an image option for a background picture, for example, from the image information B and the setting of the corresponding chip number (image data), chip location matrix, cell number, and so on.

As the process for creating the cell data has been completed, the flow then goes to step 222 to implement the process for creating block data. In the block data creating process, a cell number is selected from the cell data options and the data such as cell number, cell location matrix, block number and so on corresponding to the cell number option selected is set. After the settings of the cell data, then the flow goes to step 223 at which to implement the process for creating status chip data. In the process for creating the status chip data at step 223, there are set the data such as a status chip number, status information, character occurrence information, and so on. Then, at step 224, the process for creating status cell data is implemented, followed by proceeding to step 225 at which to implement the process for creating status block data.

More specifically, in the process for creating the status cell data at step 224, there are set the status chip number, status chip location matrix, status cell number, and so on. In the process for creating the status block data at step 225, there are set the status cell number, status cell location matrix, status block number, and so on. After step 225, the flow goes to step 226 at which the process for creating the map data is implemented. In the process for creating the map data, a certain image block is selected from block data options and there are set a block number, block location matrix, map number, and so on, followed by the end of the process for editing the map information.

A description will now turn to the process for editing the motion information with reference to FIG. 22 which shows a flow chart for the motion information editing process. As shown in FIG. 22, the process for editing the motion information comprises setting an animation number and the data such as a display time, display continuation time and so on corresponding to the animation number at step 231. The motion information created by this editing process is then subjected to the data setting for integrating the animation information. The settings of these data are implemented on the menu display screen, and the multiple pieces of the animation information are associated with one another as the motion information.

Then, the flow goes to step 232 and it is decided to determine if the editing of the motion information is to be finished. If all the editing processes are not yet finished, the flow returns to step 231 to repeat the motion information editing process until all the processes are to be completed. On the other hand, if the decision to end the motion information editing process is made, then the flow goes to step 233 and the images are displayed sequentially one after another in accordance with the animation numbers set as the motion information to confirm the edited motion information. In other words, the process at step 233 is to display the images corresponding to the animation numbers specified by the operator sequentially one after another on the display device, followed by the end of the motion information editing process.

The scroll information editing process will now be described with reference to FIG. 23 which shows a flow chart for the process for processing the scroll information editing process. In the scroll information editing process, first, at step 241, a map number is set, with the data of a scroll status, a scroll continuation time and so on, corresponding to the map number set. In other words, the scroll information created by the scroll information editing process is subjected to the data setting for integrating the map information and associated with multiple pieces of the map information.

Thereafter, at step 242, it is decided to determine if the editing of the scroll information is to be ended. If all the scroll information editing processes are not yet finished, then the flow returns to step 241 and the scroll information editing processes are repeated until all the processes have been finished. On the other hand, if it is decided that the scroll information editing process is to be ended, then the flow goes to step 243 at which the background images having the map numbers set as the scroll information are displayed sequentially one after another to confirm the edited scroll information. In other words, the process at step 243 is to display the images corresponding to the map number option specified by the operator in a time series on the display device, followed by terminating the scroll information editing process.

A description will now be made of a specific example of creating an animation program by entering editing images for an editing object from the scanner device, creating the image data, and integrating multiple pieces of the image data. These processes are implemented during the implementation of the picture editing process, the animation editing process, the motion information editing process, the map information editing process, and the scroll information editing process.

In the picture editing process for implementing the process for creating the image data, there may be implemented the editing process (modifying process), including the input of the images directly from the tablet device 14, in addition to the input of the images by the scanner device 15. Therefore, the operator performs the input operation for entering the images manually using the mouse device 12 or an operating portion of the scanner device 15 of a manually operable type. A description will now be made of a specific example of editing the images as an editing object entered from the scanner device 15.

Figure 24:
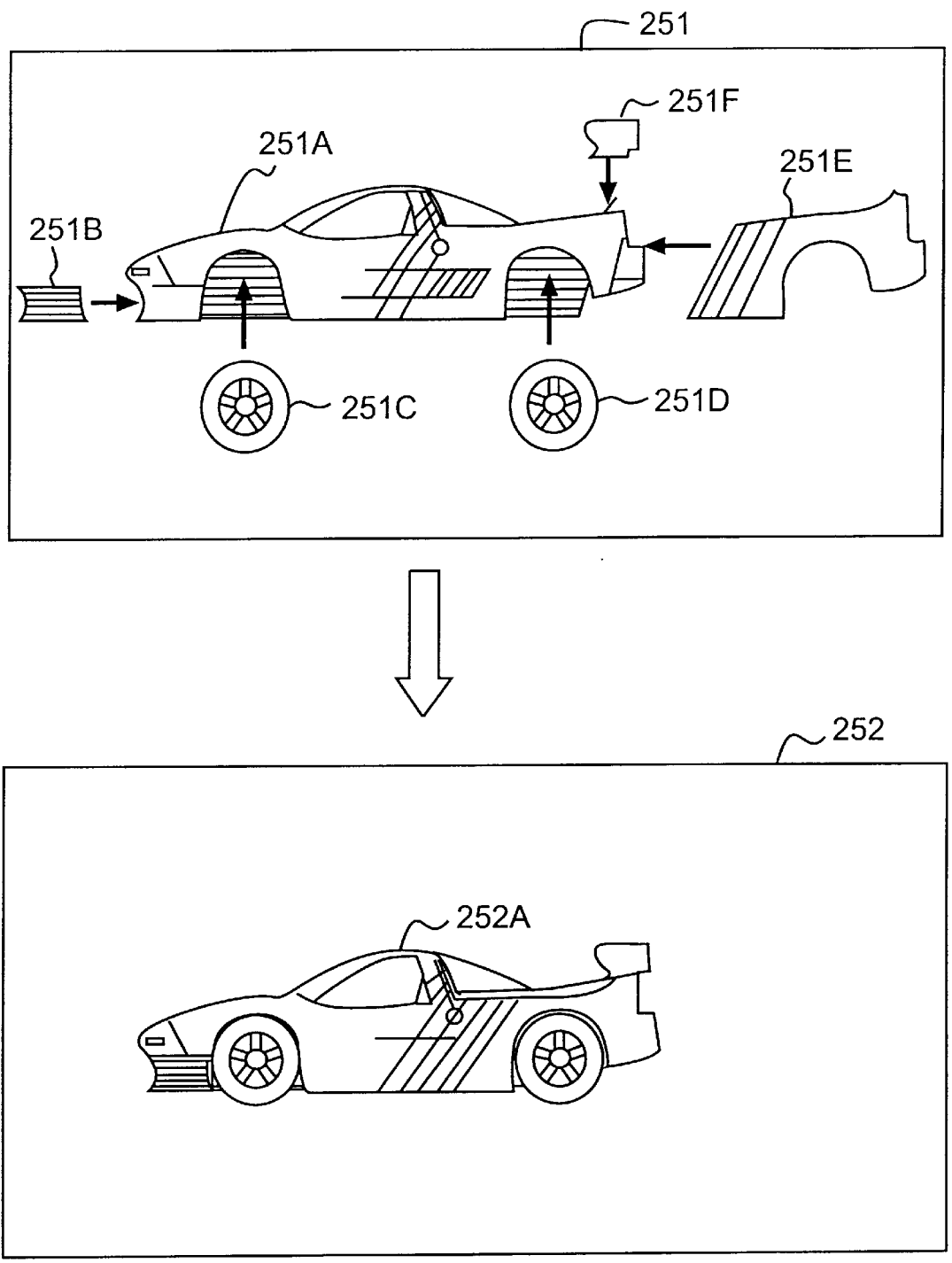
FIG. 24 is a view for describing the editing of image (picture) data after the input of the image by the animation editing process.

FIG. 24 shows image (picture) data after the input of the images from the scanner device for describing the way of editing the image data. At the upper side of FIG. 24, the operator edits multiple pieces of the image data on the display screen 251 into an image (picture) as sought to be drawn by the operator using the input device for entering image data, such as the mouse device 12 or the tablet device 14. For example, when a picture of a car is created as image data, a picture representing a vehicle body 251a of the car is entered as a base image. In order to change the color and the shape of the car, the image data are then edited by changing the colors and shapes of a front bumper portion 251b, a front wheel 251c, a rear wheel 251d, a rear bumper portion 251e, and a rear wing 251f. By editing the image data in the manner as described hereinabove, the picture of the car is edited to the picture as shown at the lower side of FIG. 24, leading to the completion of the vehicle body 252a of the car on the display screen 252.

The various functions of the picture editing process for editing the images in the manner as described hereinabove are substantially equal to the processing functions provided for commercially available image processing programs referred to as paint software. Those functions include the functions of drawing a picture and painting it with colors. Hence, the image processing programs may be employed as the functions for the picture editing process according to the present invention.

The images of the image data in the process of editing and the images of the image data after the completion of the editing process can be displayed on the second display screen 33 in order to confirm the contents of the images (step 205). The display screen 252 at the lower side of FIG. 24 is an example of displaying the image data completed by the picture editing process on the second display screen 33. In accordance with the present invention, the images can be confirmed by displaying the images in substantially the same manner as the images are actually displayed by the game software. Therefore, the present invention can greatly reduce the labor work of modifying the editing of the images after the game software has been completed.

As the editing of the images has been completed, the edited images are registered. The registration of the images is performed by registering them in the auxiliary storage 40 as the image information A or B. In this case, as described hereinabove, the images relating to the various characters, such as persons or animals, are registered as the image information A and the images relating to the background pictures are registered as the image information B, because the images are employed later as parts data upon creation of the animation program. For example, the image data of the car as shown in FIG. 14 is employed as a character image so that it is registered as the image information A by providing for the image number.

Figure 25:
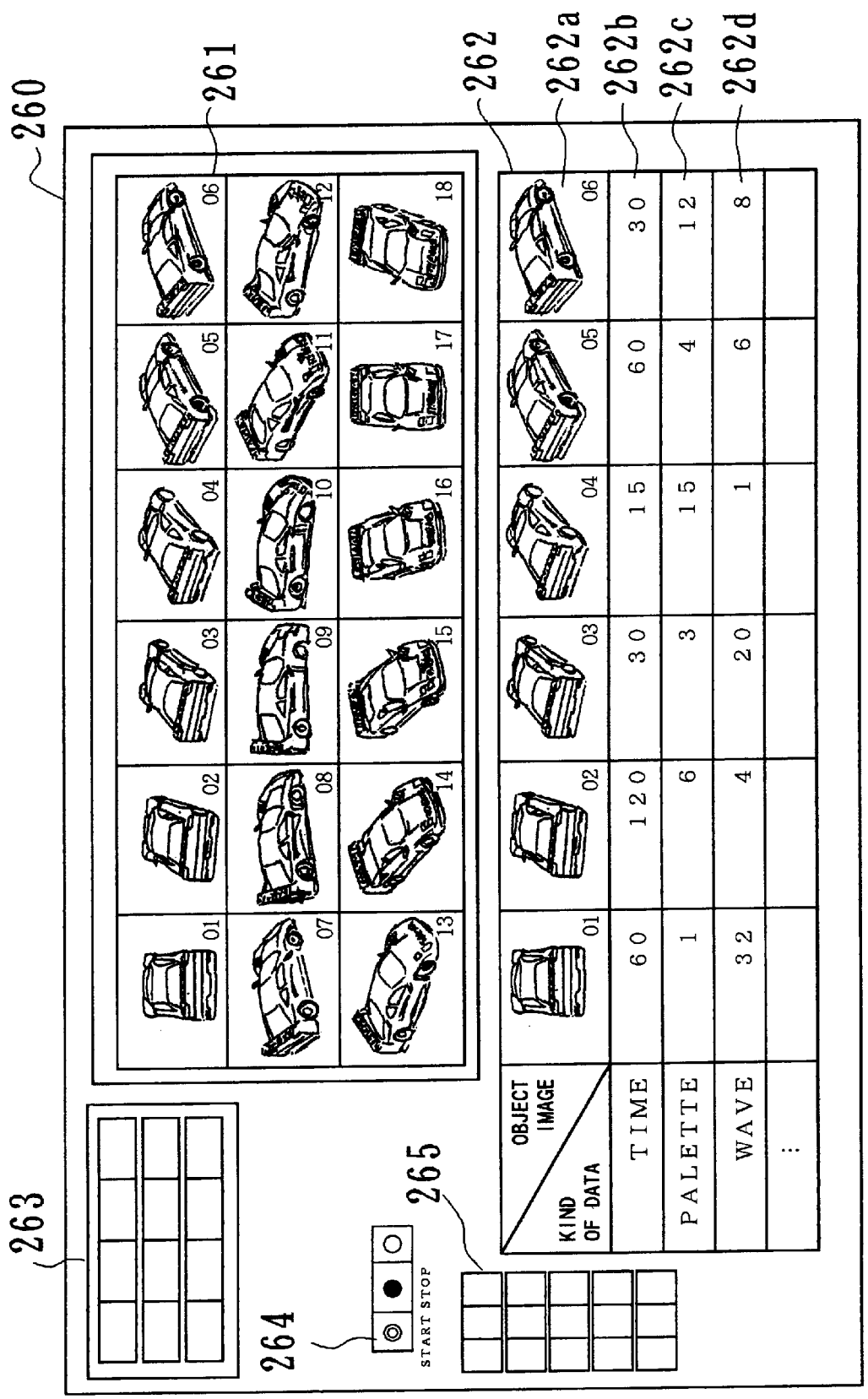
FIG. 25 is a view showing an example of a display screen for setting information for integrating multiple pieces (slices) of the image data of the image numbers by the animation editing process.

As the creating of the image data has been completed by the picture editing process in the manner as described hereinabove, the image data is then subjected to the animation information editing process in which the multiple pieces of the images are integrated. FIG. 25 shows an example of the display screen for setting information in the case of integrating multiple pieces of the image data having the image numbers by the animation editing process. As shown in FIG. 25, the display screen 260 for editing the animation information calls the image data registered as the image information A and displays it in an image sample palette 261, followed by entering each of setting data using an animation information input field 262 for the data setting.

In order to perform the operation for editing the animation information, the animation information input field 262 is provided with an object image field 262a, a display continuation time (TIME) field 262b, a color designation (PALETTE) field 262c, and a sound designation (WAVE) field 262d. On the editing screen 260 for editing the animation information, there are additionally located a tool palette 263 having a collection of buttons for activating various editing tools, operating buttons 264 for operating the reproduction of moving images by the animation information created, and an animation number display field 265 for displaying the animation numbers of the animation information already created. By specifying the animation number of the edited animation information display on the animation number display field 265, the specified animation information can be re-edited.

The editing screen 260 of the animation information referred to herein may be constructed so as to collectively enter each of data (display continuation time TIME, color designation PALETTE, and sound designation WAVE) corresponding to six pieces of images on one menu screen. For example, when the image data having the image number "01" displayed in the image sample palette 261 for displaying a list of the image data as editing objects is selected and specified by the operation of the mouse button, the image data having the image number "01" selected in the object image field 262*a* are displayed in the animation information input field 262 located at the lower side of the screen, thereby allowing the display of the selection of the image data with the image number "01" as an object image.

Further, each data of setting the display continuation time, color and sound for the object image is entered, respectively, into the display continuation time (TIME) field 262*b*, the color designation (PALETTE) field 262*c*, and the sound designation (WAVE) field 262*d*. The input of the setting data for each of the image data is performed using each column of the animation information input field 262 in the order of sorting multiple pieces of the image data in a time series as animation images. As a result of setting the animation information for each image data, the order of displaying the image data along the time axis (the order of animation) is set to be arranged from the left column to the right column of the animation information input field 262.

The input of each of the setting data for setting the display continuation time, color and sound of the object image is performed by entering numeric value data of each "data kind" from the keyboard. As shown in FIG. 25, in the process for editing the animation information in this case, the image data having the image numbers "01" to "06", inclusive, is selected and the setting data for setting the display continuation time, color and sound of the object image is entered for each of the image data.

In the display continuation time field 262*b*, the setting data indicating the display time of the image is entered. In the process for drawing the moving images, each of the moving images is set to be processed in the display unit of one sixtieth (1/60) second so that the display continuation time field 262*b* for, for example, the object image "01" of the image data is entered with the numeric value data "60". Therefore, this means that the image data may be displayed for one second. The color designation field 262*c* is entered with the setting data for specifying the color of the image, and the numeric value data entered in this field indicate the number provided for the color in a palette table (not shown) defining the colors. This means that the color of the object image "01" is displayed with the color having the color number "1" in the palette table.

Further, the sound designation field 262*d* is entered with the setting data for specifying the sound for the image data. For, the effects sounds such as explosive sounds, sounds of an engine or braking sounds are entered by the number specifying the sounds data. The sound data are stored in the auxiliary storage (not shown) with the respective numbers provided for the sounds. The data entered using the menu screen in the manner as described hereinabove are stored in each of the fields in the storage region 42 for storing the animation information. This allows multiple pieces of the image data to be associated with one another by the image numbers and they are managed as the animation information by the animation numbers. The editing of the animation numbers to be provided for the edited animation information can be performed by shifting the screen of FIG. 25 to an animation number input menu screen (not shown) and entering the data of the animation numbers.

As the data is set to allow the animation information to be managed by the animation numbers, the resulting animation information can be displayed to check how the images are animated on the screen for confirmation of the reproduction action, because the animation information in the minimal unit of drawing the moving images can be specified by the animation number. In other words, by specifying the animation numbers or the image numbers, the manner of animating the registered images of the animation information can be displayed on the screen.

The operation of displaying the moving images can be performed by clicking the mouse button on an operating button 264. In this case, the animation information for the display object is specified in advance. The process for specifying the animation information for the display object may be implemented by identifying the animation numbers of the animation information containing the images having the corresponding image numbers by specifying the animation numbers directly or the image numbers.

Figure 26:
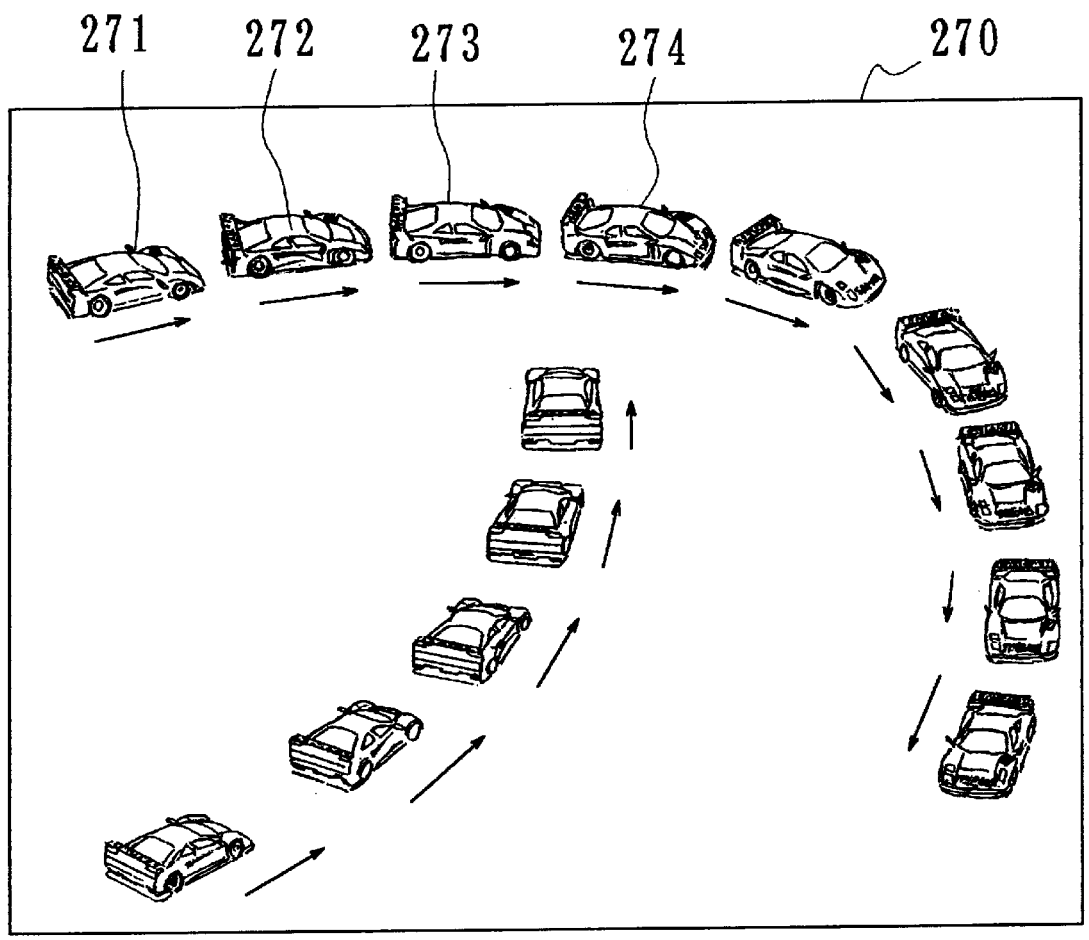
FIG. 26 is a view showing an example of animating two pieces of animation information by selecting two animation numbers.
Figure 27:
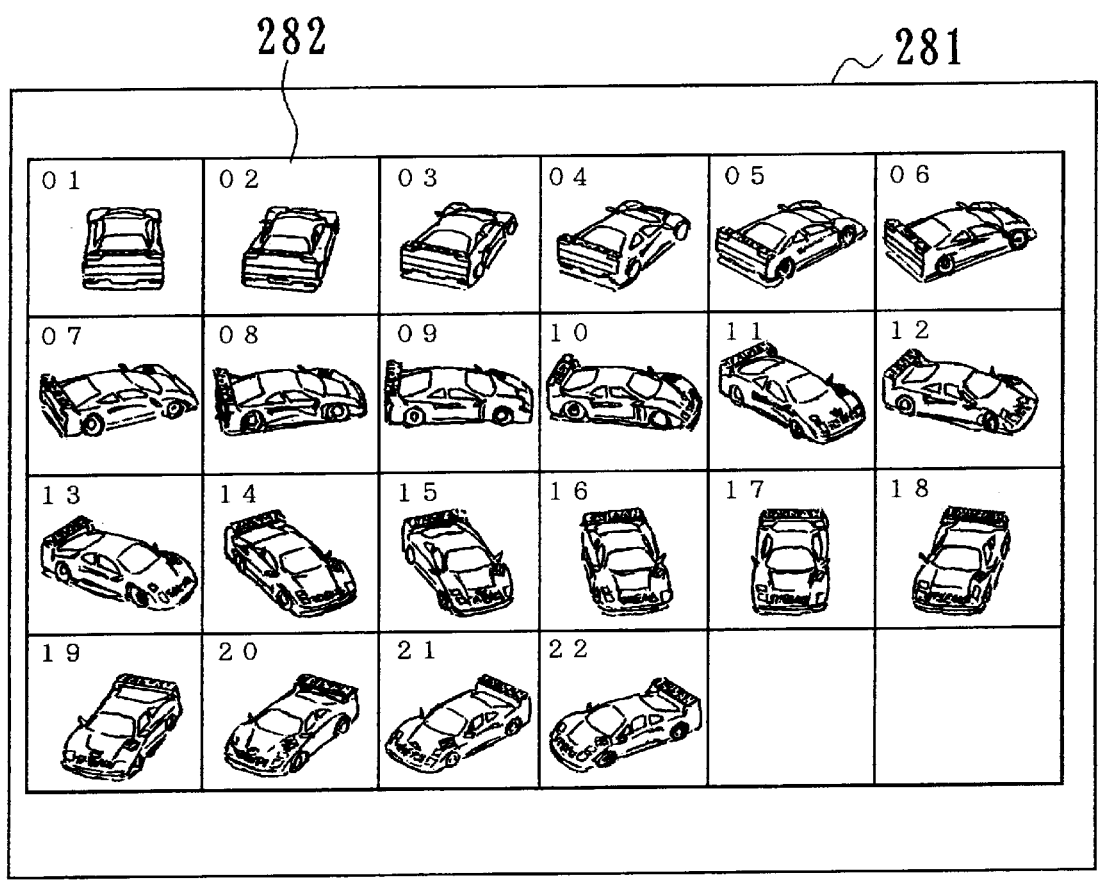
FIG. 27 is a view showing an example of image data registered in advance in a library of the image data by a process of editing picture information.

FIG. 26 shows an example of animating two pieces of animation information by selecting two animation numbers. In the example of the image-drawing screen 270 as shown in FIG. 26, the motion of a first car is animated to animate from the upper left side of the display screen through the upper right side thereof to the lower right side thereof. In addition, a second car moves from the lower left side of the display screen toward the center thereof. As the image data of the car shown in the positions in which the motion of the car is seen at different angles are registered as image information, the image data can be employed as basic data for the motion of the such car. For example, the motion of the first car may be represented by images 271, 272, 273, 274, . . . , continuing from the upper left side of the display screen to the upper right side thereof. A series of this motion of the first car corresponds to image numbers "07", "08", "09", and "10" registered in advance in a library of the image data created by the process for editing the picture information.

The menu screen for the motion information editing process is substantially the same as the menu screen provided for editing the animation information as described hereinabove. In other words, the necessary setting data, such as the animation numbers, display kinds, display continuation times and so on, can be entered efficiently by opening a menu screen (not shown) for editing the motion information. The motion information entered from the menu screen is stored in the storage region of the motion information in accordance with the data construction. The motion information is associated with the animation information by the animation numbers by specifying the animation numbers registered as the animation information by the operator's instruction. Then, the data for reproducing and displaying (animating) the character images continually in accordance with the elapse of time is to be completed by setting plural animation numbers continually on the time axis and associating the images corresponding to the plural animation numbers continually with one another.

In this case, for the background images to be employed in association with the animation of the character images, the process may be implemented for the information for drawing the background images, such as scroll information, map information, block information, cell information, chip information, map status information, status cell information, status chip information, and so on, to draw the background images to change in a dynamic way, in substantially the same manner as the character images are animated. In this case, too, for the image data of the element for drawing each of the background images, i.e. the image data managed by the chip number, the data are completed by editing parameters for drawing the images as setting data on a menu screen, although not shown, similar to the menu screen for implementing the editing of the animation information as described hereinabove (FIG. 25).

Figure 28:
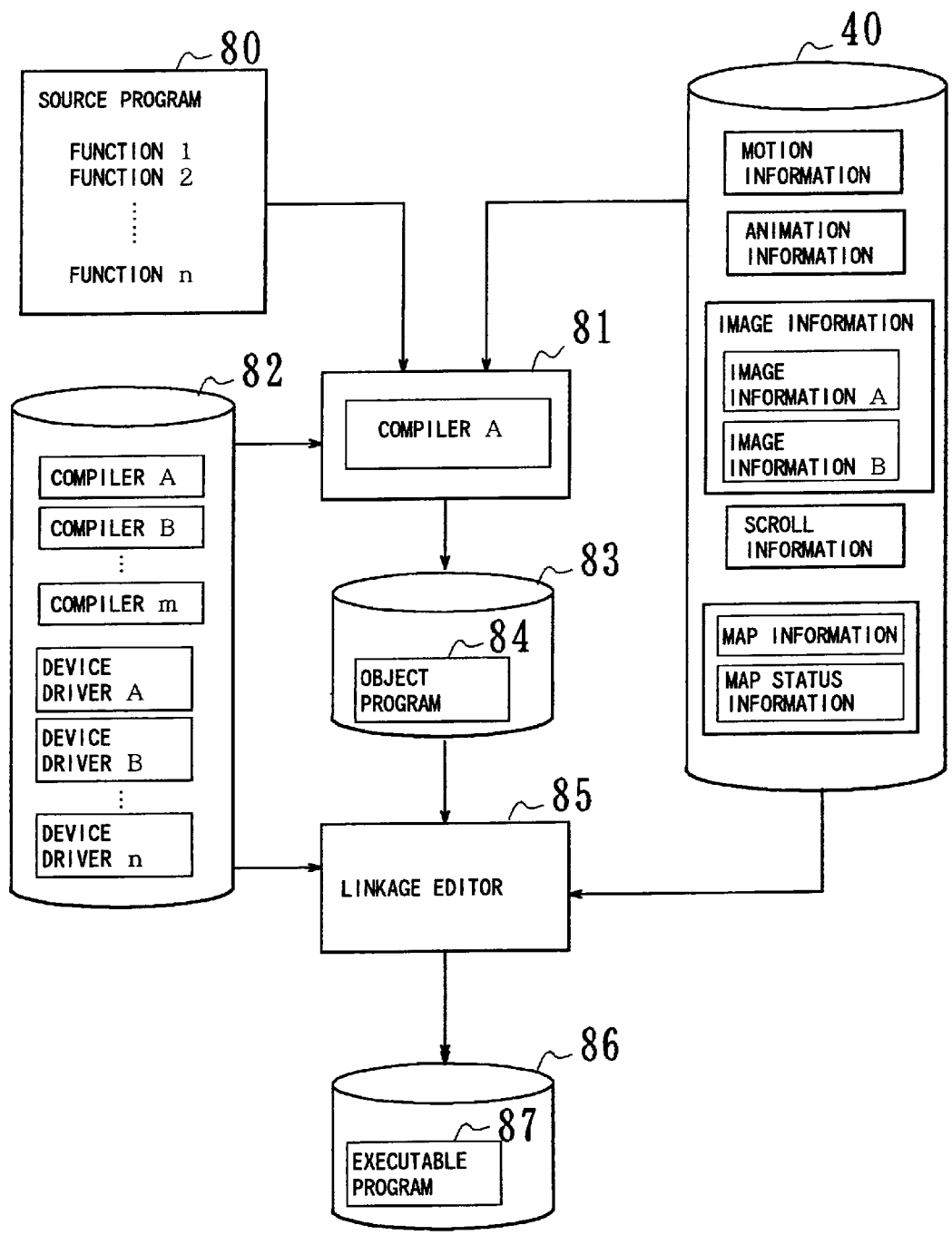
FIG. 28 is a block diagram for describing a process for creating a game software (a game program).

Then, a description will be made of the processing method for creating a game software (a game program) using each of the data created in the manner as described hereinabove. FIG. 28 is a block diagram for describing the process for creating such a game software, and the process for creating the game software will be described briefly hereinafter.

Where a game software (a game program) is created, a basic scenario of the game is first constructed and a source program 80 is created using functions (statement language) in accordance with the construction of the basic scenario. The source program 80 creates (codes) the scenario of the game and the animation information to be employed in the scenario thereof by defining the animation numbers of the animation information with the functions, the animation information being for drawing the character images created by the editing process by the image edit processing program in advance and stored in the auxiliary storage 40.

When the coding of the source program 80 of the game program has been finished, the source program is programmed and stored in an auxiliary storage 82 in advance so as to comply with the hardware specification to run the game program on the hardware (game machine) of a certain manufacturer, and the respective compiler (compiler A, compiler B, ..., compiler m) is selected. For example, if the source program 80 of the game program is intended to compile for a game machine of a company A, the compiler A is selected and the program is compiled in a compile processing section 81, thereby allowing an object program 84 to comply with the hardware specification for the game machine of the company A. In this example, the operator selects the compiler A.

In this example, the auxiliary storage 82 is provided with different compilers (e.g. compiler A, compiler B, ..., compiler m) of game machines of different manufactures, and the compiler involved is called and employed by the compile processing section 81. It is also possible to allow the operator to directly enter the kind of the compiler or the like as a parameter, thereby allowing the compile processing section 81 to determine the compiler among the compilers provided therein and creating an object program specified by the parameter.

The object program 84 created in the manner as described hereinabove is then transmitted to a linkage editor 85 to assemble a device driver programmed in advance with the auxiliary storage 82 so as to comply with the specification of the hardware or the like corresponding to each of the game machines of different manufacturers and to complete an execution type program 87 that in turn is stored in an auxiliary storage 86. In other words, as the corresponding device driver of an object program type is prepared for each of the game machines of different manufactures, for example, the device driver A of the company A is selected from such device drivers and linked to the object program 84 and the image information, whereby the execution program 87 is completed.

The completed execution program 87 is stored in the auxiliary storage 86 such as a floppy disk (FD) device or a magneto-optic disk (MO) device. In the auxiliary storage 87, the image information and so on stored by the linkage editor 87 as part of the execution type program 87 in the auxiliary storage 40 to be employed (referenced) by the object program 84. This allows the objective game software to run on the game machine of the company A by installing the execution type program 87 in the hardware of the game machine thereof and activating it.

Now, a description will be made of a specific example of a game program (a source program) created in the manner as described hereinabove. FIG. 29 shows an example of the source program for animating the characters and FIG. 30 shows the animation by the source program.

As shown in FIG. 29, a source program 301 consists of an initialization section 302 and an execution section 303. In the initialization section 302, the name of the initializing process is set as "Sample_chr_Init()" and, in the initializing process, an execution function "Sample_chr_Main()" of the program for drawing a character is set as a task to be executed for every one sixtieth (1/60) second by a function "TaskEntry(Sample_chr_Main, 0, 0, 0, 0)". Then, the use of a first sprite is declared by the next function "SpcAllocBuffer(1)" and an animation "A1" is then displayed in the first sprite by the next function "SpcSetCharacter(1, A1)" and the position of the first sprite is set in the coordinates (50, 100) by the next function "SetSpcPosition(1, 50, 100)".

Further, in the execution section 303, the name of the execution function is set as "Sample_chr_Main()" and, in the execution function, the position of the X-coordinate of the first sprite is set to be added by five per each processing by the function "SpcMoreXposition(1, 5)". Then, as the X-coordinate of the function "SpcMoreXposition(1)" of the first sprite has reached 150, the first sprite involved is released by the next IF statement "If(SpcGetXposition(1)==150) {SpcReleaseBuffer(1), TaskRelease()}", followed by the end of the process and the release of the task by the function "TaskRelease()".

When the initialization process "Sample_chr_Init()" is called in order to execute the process in the program as described hereinabove, as shown on the upper side of FIG. 30, the animation A1 is displayed on the screen in the position of the coordinates (50, 100) of the initial value and the animation A1 moves from the initial coordinates (50, 100) position to the next coordinates (150, 100) position on the screen at the speed of five units per every one sixtieth (1/60) second, as shown on the lower side of FIG. 30.

Figure 32:
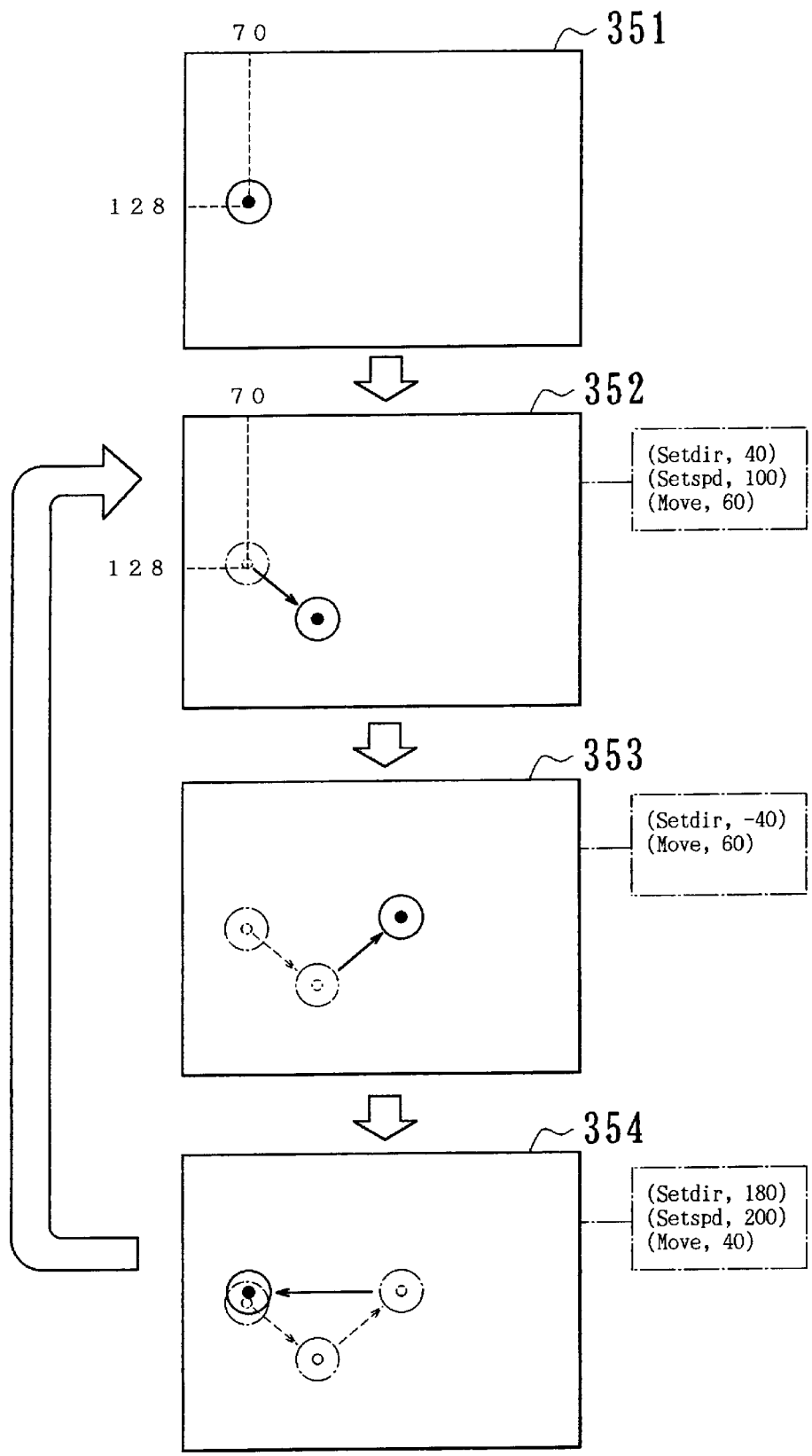
FIG. 32 is a view for describing an animation by the source program of FIG. 31.

FIG. 31 shows an example of a source program for animating a character by animation information and motion information and FIG. 32 shows the animation of the character by the source program.

As shown in FIG. 31, the source program 311 consists of a motion data definition section 312, an initialization section 313 and an execution section 314. In the motion data definition section 312, data on the motion of the character in each scene is set sequentially as a motion information "MotionDat". Mote specifically, in the definition by this motion information, an animation A3 is displayed in the position of the coordinates (70, 128) of the initial value on the screen as shown on the screen 351 of FIG. 32. The direction of the movement of the animation A3 is set by (SetDir, 40) so as to allow the animation A3 to move at an angle of 40 degree relative to the X-coordinate of the screen, and the speed thereof is set to be 100 by (SetSpd, 100). Further, the duration of the movement of the animation A3 is set to be 60/60 second by (Move, 60). As a result, the animation A3 can be moved as shown on the screen 352 of FIG. 32.

On the next screen, the direction of the movement of the animation A3 is set to −40 degree by (SetDir, −40) and the movement of the animation A3 is set to continue 60/60 second by (Move, 60). As a result, the animation A3 can be moved as shown on the screen 353 of FIG. 32. Then, on the next screen, as the direction of the movement of the animation A3 is set to 180 degree by {SetDir, 180), the speed of movement thereof is set to be 200 by (SetSpd, 200), and the movement thereof is set to continue 40/60 second by (Move, 40), whereby the animation A3 can move in the manner as shown on the screen 354 of FIG. 32. On the next screen, it is set such that the screen jumps to the initial screen 352 because the data is returned to the initial value by {Jump, 0}. By setting the source program in the manner as described hereinabove, the animation can be displayed continually starting with the screen 352 through the screens 353 and 354 and returning back to the screen 352.

As the control program for executing an animation processing program by the data definition section 312 defined herein, there are provided the initialization section 313 and the execution section 314 as described hereinabove.

In the initialization section 313 of the program, the name thereof is set as "Sample_seq_Init()" and, in the initialization section, an execution function "Sample_seq_Main()" of the program for drawing the character is set as a task for executing the program at every one sixtieth (⅟₆₀) second by a function "TaskEntry (¯Sample_seq_Main)". Then, by the next function "SpcAllocBuffer(5)", the use of a fifth sprite is declared, followed by the display of an animation A3 in the fifth sprite by the next function "SpcSetCharacter (5, A3)" and by the setting of the position of the fifth sprite on the coordinates (70, 128) position of the screen by the next function "SetSpcPosition(5, 70, 128)". Then, an instruction is given a sequencer to execute motion information "MotionDat" by the function "SetSequence(¯MotionDat)".

In the execution section 314, the name of the execution function of the program for drawing the character is set as "Sample_seq_Main()" and a sequence driver is executed by the IF statement "If(SeqDrv()==0) {SpcReleaseBuffer (5), TaskRelease()}". If the return value is zero (0) that means the end of the process, the process is allowed to end by releasing the sprite involved, and the task is released by the function "TaskRelease()". The execution of the program in the manner as described hereinabove can construct a loop of the data of the motion information in the case where the sequencer executes the motion information "MotionDat", so that the character can continue to move without stop.

In the program as described hereinabove, when the initialization process "Sample_seq_Init()" is called, the animation A3 is continued to move on the screen from the coordinates (70, 128) position in accordance with the contents of the motion information "MotionDat", as shown in FIG. 32. In other words, in this case, the animation A3 continues to move along the locus in the form of a triangle.

Figure 34:
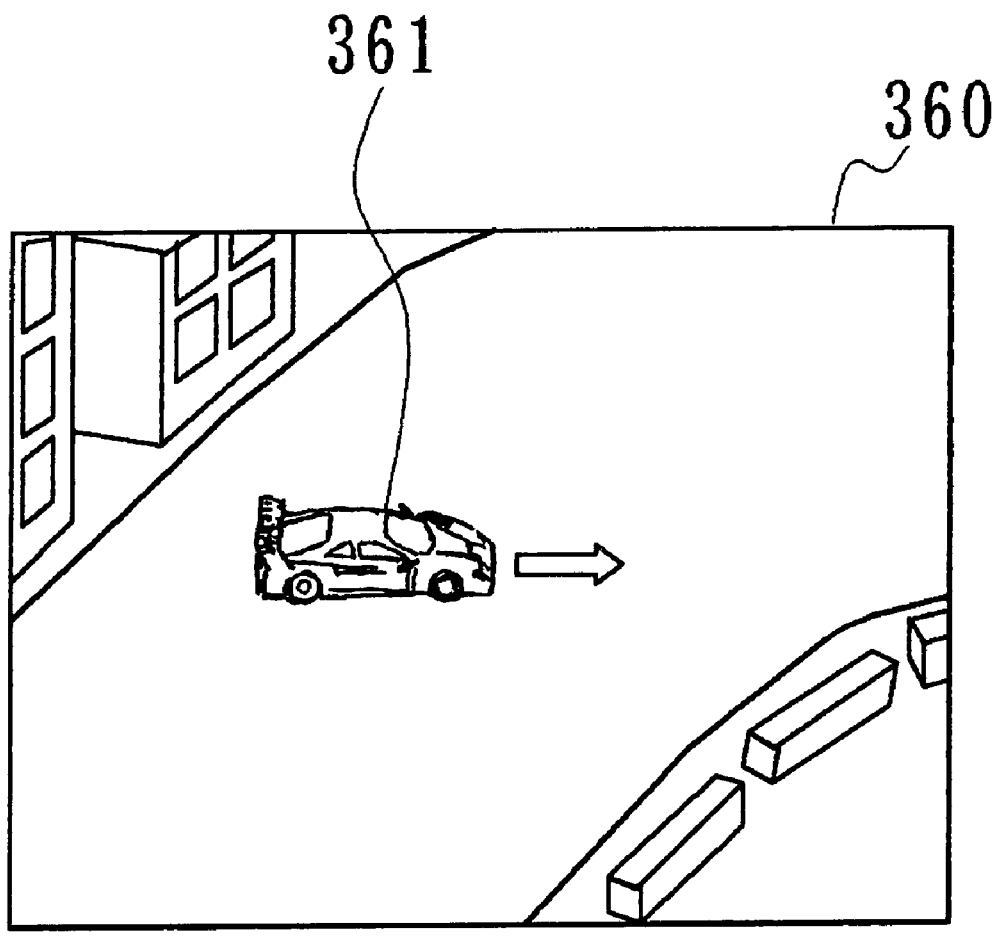
FIG. 34 is a view for describing an example of the display screen by the source program of FIG. 33.

FIG. 33 shows an example of a source program in which the development of the process for drawing images is described and programmed by a scenario data and FIG. 34 shows an example of the screen displayed by the source program.

In the example of this source program, the contents of the process for drawing a background are described by the scenario data in the manner as described hereinabove, as shown in FIG. 33. The source program 321 consists of scenario data definition section 322, an initialization section 323 and an execution section 324. In the scenario data definition section 322, the data for drawing the background is described as a scenario data "ScenarioDat". More specifically, in the definition of the scenario data, a background image task is activated by the first line definition "Call, ¯MapInit" and the action to draw the background picture is waited for 100/60 seconds by the next line definition (Wait, 100). Further, the execution function "Sample_chr_Init" for drawing the character is activated by the next line definition "Call, ¯Sample_chr_Init". Thereafter, the next line definition "End, 0" gives an instruction to end the scenario data.

In the initialization section 323, the name of the initialization process is set as "Sample_mapper_Init()" and, in the initialization process, the execution function "Sample_mapper_Main()" of the program for drawing the background picture is set by the function "TaskEntry(¯Sample_mapper_Main)" as a task for executing the program for every one sixtieth (⅟₆₀) second. Then, an instruction to execute the drawing process by the scenario data "ScenarioDat" is given to the sequencer by the function "SetSequence(¯ScenarioDat)".

In the execution section 314, the name of the execution function of the program for drawing the background picture is set as "Sample_mapper_Main()" and, in the program, the sequence driver is executed by the IF statement "If(SeqDrv ()==0) {TaskRelease()}". When the return value is set as zero (0) meaning the end of the process, then the task is released and the process is allowed to end.

In the program as described hereinabove, when the initialization process "Sample_mapper_Init()" is called, the task for drawing the background picture in accordance with the contents of the scenario data "ScenarioDat" or the task for displaying the animation of the characters may be called. The scenario data are an example in which the programmer describes it directly. It can be utilized without any association with the programs for editing the images.

By describing the source programs in the manner as described hereinabove, for example, in the case where a car 361 is displayed on a background image 360 as shown in FIG. 34, the drawing of all the movement of the car can be controlled with the program by allocating the drawing of the car to a certain task by the function "TaskEntry". Accordingly, the programs can be made so as to move the car in such a manner as an operator enjoying the game wishes by allocating the drawing of another car to another task and allowing the operator to operate a handle or the like connected to the hardware circuit. Further, it is also possible to proceed with the game, for example, by allowing a third task for managing the first and second tasks to automatically shift (rewrite) the screen between the first task for drawing the movement of the first car and the second task for drawing the movement of the second car.

As described hereinabove, the method and the apparatus for creating the animation program in accordance with the present invention can simulate only the motion of the images, for example, without execution of a game program because the images of the game, the motion thereof and so on can be created separately from the program containing the scenario of the game, thereby allowing the game to be planned or reviewed before the completion of the game program and shortening the period of development of the game software to a great extent.

Further, as the present invention allows the images of the game, the motion thereof and so on to be created separately from the program containing the scenario of the game, the manual modifications of the programs to be required in accompany with the changes of the planning of the images and the motion thereof can be reduced and the programs can be created more readily, thereby improving efficiency in the development of the game software.

Furthermore, as the present invention can create the objective programs simply by programming without being conscious of the difference in the specifications of hardware and so on, the burden to be otherwise imposed upon the programmers can be reduced and as a result the efficiency in developing the game software can be improved greatly. In addition, the image data created in accordance with the present invention can be utilized easily for a variety of presentations and so on because the images can be created separately from the program.

What is claimed is:

1. An apparatus for creating an animation program having a moving image drawing device comprising a program storing circuit for storing an animation program; a character image drawing circuit for drawing a character image, drivable by said animation program; and a background image drawing circuit for drawing a background image, drivable by said animation program; comprising:

image input means for entering image information to be animated;

image editing means for editing said animating image information entered by said image input means;

animation management means for managing said entered image information by creating an animation program in an image-drawing unit of drawing an image by sorting said multiple pieces of said entered image information in a time series and by providing the animation program with an animation number; and operating means for operating said moving image drawing device to reproduce the animation program created by said animation management means;

wherein the animation program can be viewed and modified independently without necessitating reprogramming of a game program using the animation program, and wherein the game program includes a source program that is converted into an object program by one of a plurality of different compilers stored in an auxiliary storage, said one of a plurality of compilers being selected depending upon a particular game machine for which the game program is intended.

2. An apparatus for creating an animation program as claimed in claim 1, wherein said operating means gives an instruction to reproduce an image-drawing unit of the animation program provided with said animation number.

3. An apparatus for creating an animation program as claimed in claim 1, wherein said image input means is a manual image input device of a tablet type.

4. An animation program creating apparatus having a moving image drawing device comprising a program storing circuit for storing an animation program; a character image drawing circuit for drawing a character image, drivable by said animation program; a background image drawing circuit for drawing a background image, drivable by said animation program; and a sound creating circuit, comprising:

image input means for entering image information to be animated;

sound information input means for entering sound information;

image editing means for editing said animating image information entered by said image input means and said sound information entered by said sound information input means;

animation management means for managing an animation program by creating the animation program in an image-drawing unit of drawing an image by sorting said multiple pieces of said entered image information and sound information in a time series and by providing the animation program with an animation number; and operating means for operating said moving image drawing device to reproduce the animation program created by said animation management means;

wherein the animation program can be viewed and modified independently without necessitating reprogramming of a game program using the animation program, and wherein the game program includes a source program that is converted into an object program by one of a plurality of different compilers stored in an auxiliary storage, said one of a plurality of different compilers being selected depending upon a particular game machine for which the game program is intended.

5. An apparatus for creating an animation program as claimed in claim 1, wherein:

said animation management means is provided with a function providing for a motion of the animation in the image-drawing unit; and the reproduction of the image-drawing unit provided with the animation number is made using said function.

6. A method for creating an animation program for a moving image drawing device having a program storing circuit for storing an animation program; a character image drawing circuit for drawing a character image, drivable by said animation program; and a background image drawing character for drawing a background image, drivable by said animation program; comprising:

entering animation image information on an animating image;

editing said animating image information entered;

managing said animating image information by creating an animation program by sorting multiple pieces of said image information in a time series and providing an image-drawing unit of the animation program with an animation number; and reproducing said created animation program in said moving image drawing device by specifying the animation number;

wherein the animation program can be viewed and modified independently without necessitating reprogramming of a game program using the animation program, and wherein the game program includes a source program that is converted into an object program by one of a plurality of different compilers stored in an auxiliary storage, said one of a plurality of compilers being selected depending upon a particular game machine for which the game program is intended.

7. An apparatus for creating an animation program as claimed in claim 4, wherein:

said animation management means is provided with a function providing for a motion of the animation in the image-drawing unit; and the reproduction of the image-drawing unit provided with the animation number is made using said function.

* * * * *